United States Patent
Hirose

(10) Patent No.: US 9,152,294 B2
(45) Date of Patent: Oct. 6, 2015

(54) ELECTRONIC APPARATUS, DISPLAY CONTROL METHOD FOR THE ELECTRONIC APPARATUS, GRAPHICAL USER INTERFACE, AND DISPLAY CONTROL PROGRAM

(75) Inventor: Yukiyoshi Hirose, Kanagawa (JP)

(73) Assignee: Sony Corporation, Tokyo (JP)

(*) Notice: Subject to any disclaimer, the term of this patent is extended or adjusted under 35 U.S.C. 154(b) by 903 days.

(21) Appl. No.: 13/285,421

(22) Filed: Oct. 31, 2011

(65) Prior Publication Data

US 2012/0137234 A1     May 31, 2012

Related U.S. Application Data

(63) Continuation of application No. 11/531,927, filed on Sep. 14, 2006, now Pat. No. 8,065,633.

(30) Foreign Application Priority Data

Sep. 14, 2005  (JP) ................................ 2005-266251
Sep. 27, 2005  (JP) ................................ 2005-279101

(51) Int. Cl.
*H04N 21/431*     (2011.01)
*G06F 3/0481*     (2013.01)
(Continued)

(52) U.S. Cl.
CPC ............ *G06F 3/0481* (2013.01); *G06F 3/0482* (2013.01); *G06F 3/0485* (2013.01);
(Continued)

(58) Field of Classification Search
CPC ............ G06F 3/0481; G06F 17/30873; G06F 3/04817; G06F 3/0482; G09G 2340/145; H04L 41/26

USPC .................. 715/864, 737, 738, 835, 810, 838
See application file for complete search history.

(56) References Cited

U.S. PATENT DOCUMENTS 6,111,566 A     8/2000  Chiba et al.
6,147,703 A    11/2000  Miller et al.
(Continued)

FOREIGN PATENT DOCUMENTS

JP     10-293759     11/1998
JP     11-073428      3/1999
(Continued)

OTHER PUBLICATIONS

European Patent Office, Extended European Search Report issued in connection with European Patent Application No. 06018977.6, dated Sep. 10, 2012. (10 pages).

(Continued)

*Primary Examiner* — Rashawn Tillery
(74) *Attorney, Agent, or Firm* — K&L Gates LLP

(57) ABSTRACT

An electronic apparatus, display control method thereof, graphical user interface, and display control program are provided. The electronic apparatus includes a total-number obtaining unit to obtain information about a total number of items to be provided from a source; a first display unit to display undetermined representation images on a screen if it is determined that some of the representation images displayed on the screen have been changed; a determining unit to determine whether change of the representation images displayed on the screen has stopped; and a second display unit to display the representation images by obtaining, from the source, information to display the representation images to be newly displayed on the screen if the determining unit determines that change of the representation images displayed on the screen has stopped.

15 Claims, 15 Drawing Sheets

(51) Int. Cl.
*G06F 3/0482* (2013.01)
*G06F 3/0485* (2013.01)
*G06F 3/0489* (2013.01)
*G06F 17/30* (2006.01)
*H04N 5/445* (2011.01)
*H04N 21/462* (2011.01)
*H04N 21/84* (2011.01)

(52) U.S. Cl.
CPC .......... *G06F3/0489* (2013.01); *G06F 3/04817* (2013.01); *G06F 17/30058* (2013.01); *H04N 5/44543* (2013.01); *H04N 5/44591* (2013.01); *H04N 21/4312* (2013.01); *H04N 21/4622* (2013.01); *H04N 21/84* (2013.01)

(56) References Cited

U.S. PATENT DOCUMENTS

| | | |
|---|---|---|
| 6,618,082 B1 | 9/2003 | Hayashi et al. |
| 6,813,746 B1 | 11/2004 | O'Shea |
| 6,847,388 B2 | 1/2005 | Anderson |
| 6,961,908 B2 | 11/2005 | Phillips |
| 7,010,567 B1 | 3/2006 | Mori |
| 7,152,210 B1 | 12/2006 | Van Den Hoven et al. |
| 7,190,832 B2 | 3/2007 | Frost et al. |
| 7,327,347 B2 | 2/2008 | Hilbert et al. |
| 2001/0033303 A1 | 10/2001 | Anderson |
| 2002/0066105 A1 | 5/2002 | Asami |
| 2003/0038832 A1 | 2/2003 | Sobol |
| 2005/0001908 A1 | 1/2005 | Lee |
| 2005/0155070 A1 | 7/2005 | Slaughter |

FOREIGN PATENT DOCUMENTS

| | | |
|---|---|---|
| JP | 2000-013725 | 1/2000 |
| JP | 2000-232595 | 8/2000 |
| JP | 2003-296225 | 10/2003 |
| JP | 2006-033094 | 2/2006 |

OTHER PUBLICATIONS

Japanese Search Report issued Aug. 12, 2009, for corresponding Japanese Appln. No. 2005-279101.

Japanese Office Action issued Mar. 22, 2011, for corresponding Japanese Appln. No. 2005-279101.

"Undocumented Technics for middle and upper level people, Hidden usage which is not described in manuals, Second part", PCing, Gakushukenkyu-sha Co., Ltd., Aug. 1, 1999, pp. 68-69, vol. 11, No. 8.

Screendumps (Substitute Image feature of Windows XP Professional Ver. 5.1: 2001).

ELECTRONIC APPARATUS, DISPLAY CONTROL METHOD FOR THE ELECTRONIC APPARATUS, GRAPHICAL USER INTERFACE, AND DISPLAY CONTROL PROGRAM

CROSS REFERENCES TO RELATED APPLICATIONS

The present application is a continuation of U.S. patent application Ser. No. 11/531,927 filed on Sep. 14, 2006, which claims priority to Japanese Patent Applications JP 2005-266251 and JP 2005-279101 filed in the Japanese Patent Office on Sep. 14, 2005 and Sep. 27, 2005, respectively, the entire contents of which are incorporated herein by reference.

BACKGROUND

The present disclosure relates to an electronic apparatus, a display control method for the electronic apparatus, a graphical user interface, and a display control program to display many items to be provided, such as content and functions, on a screen so that a user can select one of the items.

Media used to provide image or music content have diversified, and types and amount of provided content have been increasing. Furthermore, mass-storage hard disk devices and semiconductor memories have been used as storage media (content storing units) to store the content, so that various types of and a large amount of content can be provided.

Conventionally, a so-called multimedia playback apparatus capable of playing back content stored in various media has been proposed (e.g., see Patent Document 1: Japanese Unexamined Patent Application Publication No. 11-73428).

Also, the following system has been available. That is, in the system, an electronic apparatus functioning as a content playback apparatus is connected to a personal computer or a server to store video content or music content through a network, such as a LAN (local area network). The electronic apparatus can obtain the content from the personal computer or the server and play back the content.

The above-described electronic apparatus having a content playback function should desirably have a graphical user interface enabling a user to quickly search for content to be played back.

In such a type of graphical user interface, a menu listing representation images to represent respective pieces of content by titles or thumbnails is displayed on a screen as items to be selected by a user, so that the user can select a desired piece of content through the display.

In this case, the representation images are displayed by obtaining accompanying information (meta-information), such as content titles or thumbnails, from a storage medium serving as a content providing source. Thus, if much time takes to obtain the meta-information, it is difficult to quickly provide a user with representation images to select content.

In particular, when representation images of content are displayed by obtaining the meta-information from a storage medium, such as a personal computer or a server, connected to the electronic apparatus through a network, it is difficult in the electronic apparatus to quickly display all of the representation images of the content if network delay occurs.

In a conventionally-adopted method, representation images of content found through a network are sequentially displayed in the electronic apparatus immediately after each of the images are found so that a user can recognize the content stored in an apparatus connected through the network without stress.

In this method, however, if the user wants to select the last piece of the content stored in the apparatus connected through the network, the user can select the last piece of the content only after meta-information about all pieces of the content has been obtained and the representation images thereof have been displayed.

For example, assume that it takes t seconds to obtain meta-information of one piece of content. In that case, it takes n×t seconds to obtain meta-information of n pieces of the content. The user has to wait for this time period before selecting a piece of the content.

SUMMARY

The present application has been made in view of the above-described circumstances and is directed to providing a graphical user interface enabling a user to quickly select an item to be provided.

According to an embodiment, there is provided an electronic apparatus to display some of representation images representing a plurality of items to be provided from a source on a screen in a line as items to be selected and to change some of the representation images displayed on the screen in accordance with a user's operation input through a user operation accepting unit. The electronic apparatus includes a total-number obtaining unit configured to obtain information about a total number of the items to be provided from the source; a first display unit configured to display undetermined representation images on the screen instead of the representation images which are to be newly displayed on the screen if it is determined that some of the representation images displayed on the screen have been changed, the undetermined representation images being generated on the basis of the total number obtained by the total-number obtaining unit so that the respective undetermined representation images correspond to the total number of the items to be provided; a determining unit configured to determine whether change of the representation images displayed on the screen performed by the user's operation has stopped; and a second display unit configured to display the respective representation images by obtaining, from the source, information to display the representation images to be newly displayed on the screen if the determining unit determines that change of the representation images displayed on the screen performed by the user's operation has stopped.

In the electronic apparatus having the above-described configuration, information about the total number of the items to be provided is obtained from the source before representation images representing a plurality of items to be provided from the source are displayed on the screen.

Then, undetermined representation images corresponding to the total number of the items to be provided generated on the basis of the total number are displayed instead of the representation images of the items to be provided. The user can select an item to be provided by using the undetermined representation images.

After the user stops changing the representation images displayed on the screen so as to select an item to be provided, the electronic apparatus obtains information used to display detailed representation images of the items to be provided from the source and displays the representation images by using the obtained information by erasing the undetermined representation images.

According to the embodiment, undetermined representation images can be displayed and selection of an item to be provided can be accepted by using the undetermined representation images even if representation images to be displayed on the screen have not been prepared.

In that case, after the user has stopped selecting an item to be provided using the undetermined representation images and after the representation images to be displayed on the screen have been determined, information to display the representation images to be newly displayed is obtained from the source, so that the representation images are displayed.

Even if all of the representation images displayed on the screen are changed, the number of all of the representation images is that for being displayed on only one screen, and thus the information can be quickly obtained and the representation images can be quickly displayed so as to accept selection by the user.

According to an embodiment, undetermined representation images are displayed when representation images of items to be provided are not ready to be displayed on the screen, so that selection of an item can be accepted by using the undetermined representation images.

The information used to display the representation images obtained from the source is information corresponding to the representation images that can be displayed on only one screen. Therefore, the information can be obtained in a short time and the representation images can be quickly displayed so as to accept selection by the user.

Additional features and advantages are described herein, and will be apparent from the following Detailed Description and the figures.

Additional features and advantages are described herein, and will be apparent from the following Detailed Description and the figures.

DETAILED DESCRIPTION

Embodiments of the present application will be described below in detail with reference to the drawings.

Hereinafter, an electronic apparatus according to an embodiment is described with reference to the drawings. In this embodiment, the electronic apparatus is applied to a broadcast receiving apparatus capable of receiving broadcast signals from a plurality of types of broadcasting media. The broadcast receiving apparatus connects to another apparatus through a network and is capable of playing back video content and music content supplied from the other apparatus. In the embodiment described below, icons are used as representation images.

Herein, "content" includes text, figure, color, audio, action, or video data of a movie, music, drama, literature, photograph, comic, animation, computer game, and so on, or a combination thereof, or a program to provide information about the data through an electronic computer. The content belongs to a field of culture or entertainment among works generated by creative human activities.

Figure 1:
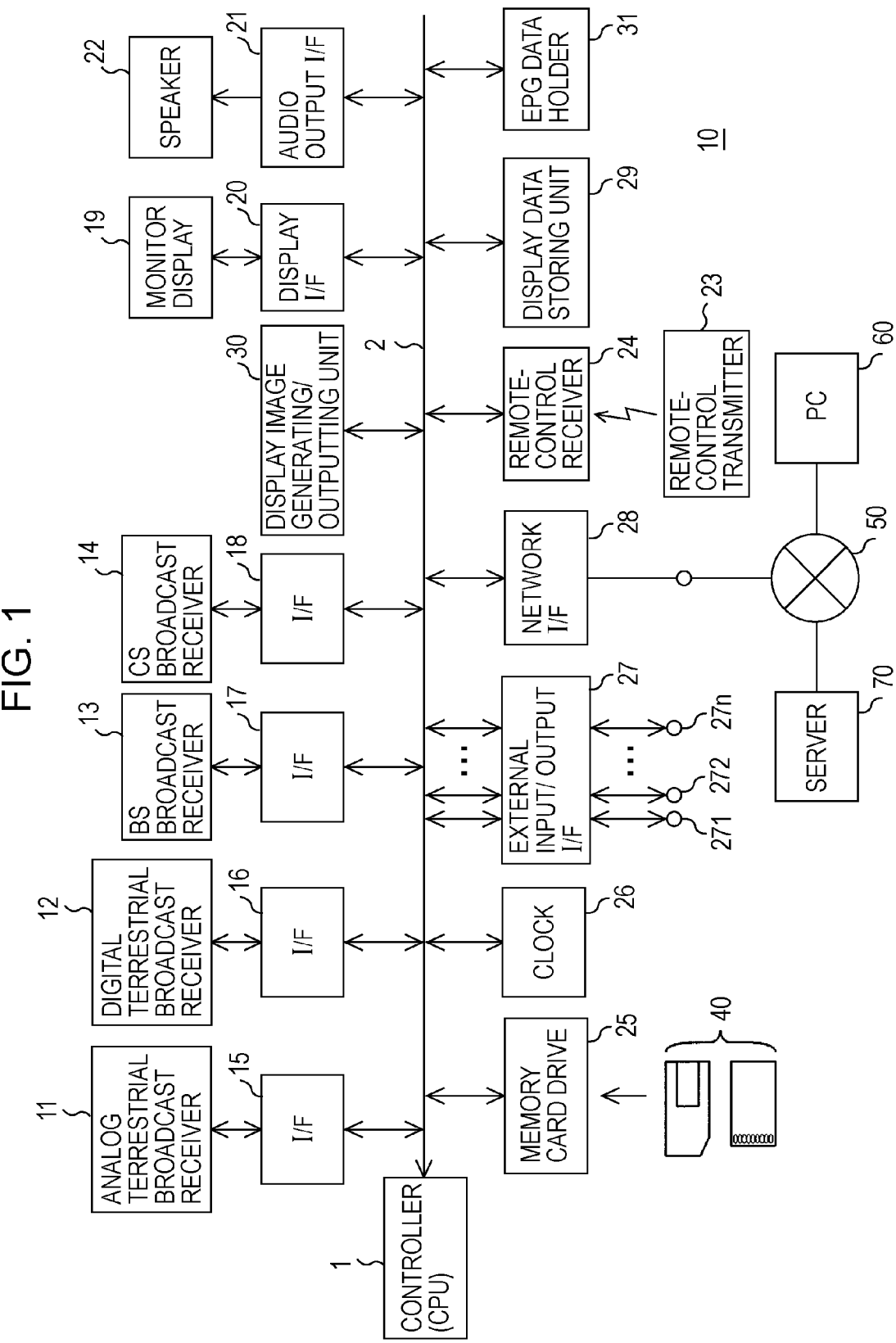
FIG. 1 is a block diagram showing an example of a hardware configuration of a broadcast receiving apparatus serving as an electronic apparatus according to an embodiment.

FIG. 1 is a block diagram showing an example of a hardware configuration of a broadcast receiving apparatus 10, which is the electronic apparatus according to the embodiment.

The broadcast receiving apparatus 10 includes various broadcast receivers, an image display unit, an audio output unit, and an operation input unit (described below), which connect to a system bus 2 connecting to a controller 1 including a microcomputer.

More specifically, in this embodiment, the various broadcast receivers include an analog terrestrial broadcast receiver 11, a digital terrestrial broadcast receive 12, a BS broadcast receiver 13, and a CS broadcast receiver 14. These receivers connect to the bus 2 via interfaces 15, 16, 17, and 18 for the broadcast receivers, respectively.

The analog terrestrial broadcast receiver 11 selectively receives current analog terrestrial television broadcast signals and outputs image (video) and audio signals to the system bus 2 via the interface 15.

The digital terrestrial broadcast receiver 12 is compatible with digital television broadcasting, digital audio broadcasting, and data broadcasting. The receiver 12 selectively receives and decodes a broadcast program in accordance with a selection by a user, and outputs image (video) and audio signals and data such as EPG (electronic programming guide) data to the system bus 2 via the interface 16.

The BS broadcast receiver 13 is compatible with BS television broadcasting, BS audio broadcasting, and data broadcasting. The receiver 13 selectively receives and decodes a broadcast program in accordance with a selection by a user, and outputs image (video) and audio signals and data such as EPG data to the system bus 2 via the interface 17.

The CS broadcast receiver 14 is compatible with CS television broadcasting, CS audio broadcasting, and data broadcasting. The receiver 14 selectively receives and decodes a broadcast program in accordance with a selection by a user, and outputs image (video) and audio signals and data such as EPG data to the system bus 2 via the interface 18.

As the image display unit, a monitor display 19 including a CRT (cathode ray tube) or an LCD (liquid crystal display) connects to the system bus 2 via a display interface 20. As the audio output unit, a speaker 22 connects to the system bus 2 via an audio output interface 21.

As the operation input unit, a remote-control transmitter 23 is provided. A remote-control receiver 24 to receive operation signals from the remote-control transmitter 23 connects to the system bus 2. In this embodiment, the remote-control transmitter 23 includes at least right and left buttons, up and down buttons, a home button, and a set button. An operation of these buttons on the remote-control transmitter 23 performed by a user causes selection on a graphical user interface screen.

As the right and left buttons and the up and down buttons, a cross button or a joystick can be used.

The system bus 2 also connects to a memory card drive 25, a clock 26, an external input/output interface 27, a network interface 28, a display image generating/outputting unit 30, a display data storing unit 29, and an EPG data holder 31.

Although not shown, the controller 1 includes a CPU (central processing unit), a program ROM (read only memory), and a work area RAM (random access memory), and executes various control processes by using the work area RAM in accordance with a program written in the program ROM.

Each of the broadcast receivers 11 to 14 selects a broadcast program from among broadcast signals received by an antenna (not shown), in accordance with a selecting operation input by a user via the remote-control transmitter 23. Then, the broadcast receiver transmits image and audio data of the selected broadcast program or data received through data broadcasting to the system bus 2.

In the broadcast receiving apparatus 10 according to this embodiment, a broadcast program is provided to a user from any one of the broadcast receivers 11 to 14. Whether which of the broadcast receivers 11 to 14 is selected depends on a selecting operation performed on the remote-control transmitter 23 through a graphical user interface (described below).

The memory card drive 25 reads data from a memory card 40 inserted thereto or writes data on the memory card 40. In the apparatus shown in FIG. 1, various types of memory cards can be used to write/read data.

The clock 26 provides information about current time and calendar information. Also, the clock 26 is used to reserve and set a broadcast program and to count time in accordance with various reservation settings.

The external input/output interface 27 includes external input/output terminals, e.g., video input/output terminals, audio input/output terminals, and a USB (universal serial bus) terminal, so that signals are transmitted/received between the respective input/output terminals and the system bus 2.

The network interface 28 connects to a home network LAN (local area network) 50 in this embodiment.

Figure 2:
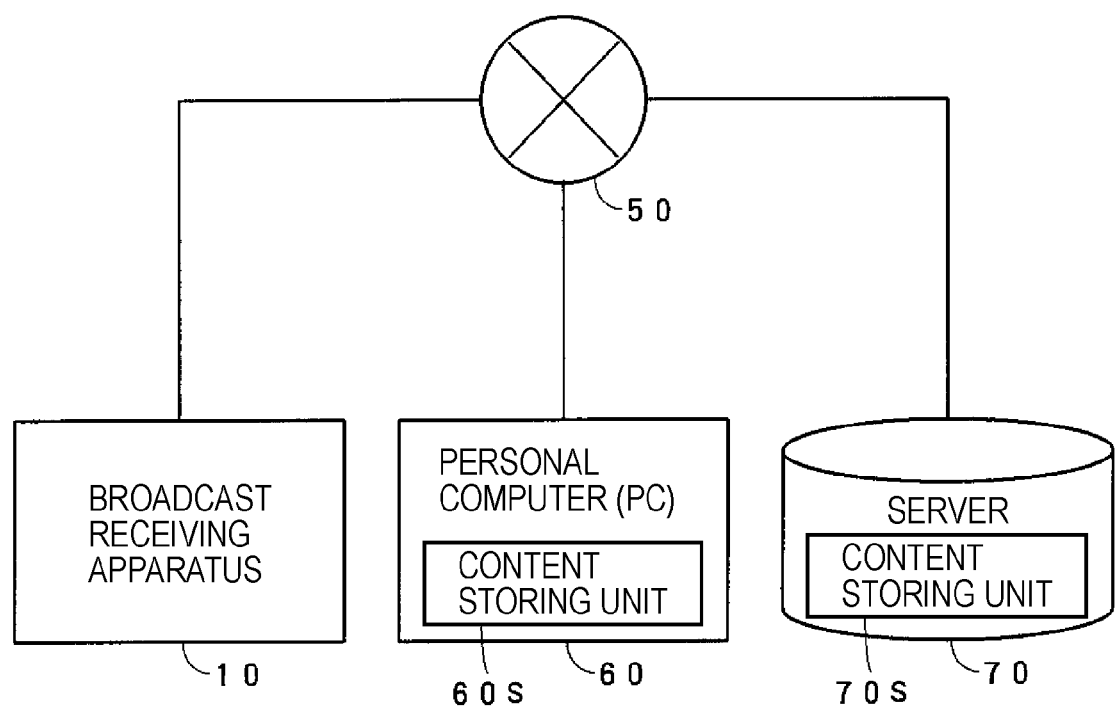
FIG. 2 shows an example of a configuration of a network system including the electronic apparatus.

FIG. 2 is a block diagram showing an example of a configuration of a network system to which the broadcast receiving apparatus 10 according to this embodiment is connected. In this embodiment, as shown in FIG. 2, the broadcast receiving apparatus 10 connects to a personal computer 60 and a server 70 through the home network 50 based on a standard of DLNA (digital living network alliance).

The personal computer 60 and the server 70 include content storing units 60S and 70S to store video and music content and so on, respectively. The personal computer 60 and the server 70 have a function to notify the broadcast receiving apparatus 10 of the total number of pieces of content stored in the content storing unit 60S or 70S when asked by the broadcast receiving apparatus 10.

Also, the personal computer 60 and the server 70 have a function to transmit meta-information to the broadcast receiving apparatus 10 when receiving a request for obtaining the meta-information used to display representation images from the broadcast receiving apparatus 10. The meta-information includes information of icon images as representation images of requested pieces of content among the pieces of content stored in the content storing unit 60S or 70S and accompanying information for explanation (e.g., information about titles and a compression method).

For example, if photo content is requested, thumbnails thereof are transmitted as icon images to the broadcast receiving apparatus 10. If music content recorded on CDs is requested, thumbnails of jacket images of the CDs are transmitted.

Also, the personal computer 60 and the server 70 have a function to read data (video or music data) of content from the content storing unit 60S or 70S and transmit the data to the broadcast receiving apparatus 10 through the network 50 upon receiving a request for the content from the broadcast receiving apparatus 10.

The display data storing unit 29 stores data to be displayed, such as data of icons constituting the graphical user interface (described below), data used to display channels, and other character data. Although not shown, the display data storing unit 29 includes a cache buffer to temporarily store meta-information received from the personal computer 60 or the server 70 through the network 50.

The display image generating/outputting unit 30 generates images to be displayed on the monitor display 19 under control by the controller 1, and functions as a display control unit in cooperation with the controller 1.

The display image generating/outputting unit 30 stores image data and music data transmitted from the broadcast receivers 11 to 14 in an output buffer provided therein. Also, the display image generating/outputting unit 30 obtains data used to display characters and symbols for the graphical user interface from the display data storing unit 29 and stores the obtained data as on-screen display data in an on-screen buffer provided therein. The on-screen display data is displayed while being superimposed on a played back image displayed on the monitor display 19. At this time, the played back image is seen through the superimposed image, such as a graphical user interface image.

Then, the display image generating/outputting unit 30 supplies composite data including the data stored in the output buffer and the on-screen display data stored in the on-screen buffer to the monitor display 19 via the display interface 20.

The EPG data holder 31 holds data of an electronic programming guide (EPG data) in a memory provide therein. As the EPG data, data superimposed during a vertical blanking time of a television broadcast signal is used in analog terrestrial broadcasting, whereas data transmitted through data broadcasting is used in digital broadcasting. The EPG data includes information about the names of broadcast stations providing respective broadcast programs, the names of the broadcast programs, start time and end time of the programs, casts, and the genre of the programs.

The EPG data holder 31 holds EPG data received from each of the broadcast receivers 11 to 14 in the memory. The EPG data held in the EPG data holder 31 is updated so that the latest data can be provided.

Instead of using EPG data transmitted while being superimposed on a broadcast signal, EPG data can be obtained from an EPG data providing server by accessing the EPG data providing server connected to the Internet by using the network interface 28.

<Description of the Graphical User Interface According to the Embodiment>

In the broadcast receiving apparatus 10 according to this embodiment, a user can easily select a broadcast medium, a broadcast program, or various functions by using the graphical user interface.

The graphical user interface according to this embodiment includes a plurality of icons and explanatory information thereof that can be selected or specified by a user by operating a predetermined button key of the remote-control transmitter 23.

The icons to be displayed on the monitor display 19 include category icons representing categories of processing functions or target to be processed, such as broadcast media, setting functions, and external input; and item icons representing processing function items and items of content to be processed belonging to each category (thus, the item icons are in a lower layer).

In this embodiment, as categories represented by category icons, the following eight types are set in advance: "setting", "video", "photo", "music", "terrestrial broadcasting", "BS broadcasting", "CS broadcasting", and "external input". Data of these eight category icons is stored in the display data storing unit 29.

The number of item icons in a lower-layer of each category, the item icons representing processing function items or items of content to be processed, differs in each category.

For example, item icons of a plurality of items, such as "setting of television", "setting of external input", and "setting of photo", belong to the category "setting".

The category "photo" relates to photo content. Item icons representing storing units for the photo content, such as "personal computer", "server", "memory card", "sample", and "mixed media", directly belong to this category.

The category "music" relates to music content. Item icons representing storing units for the music content, such as "personal computer" and "server", directly belong to this category.

The item icons "personal computer" and "server" belonging to the category "photo" or "music" have lower-layer item icons representing content stored in the content storing units 60S and 70S of the personal computer 60 and the server 70.

In the respective categories of broadcast media, item icons representing broadcast channels or the like are provided while being grouped into types of broadcasting, such as television, radio, and data.

In this case, information used to display the item icons to be held by the broadcast receiving apparatus 10 is generated by the broadcast receiving apparatus 10 and is stored in the display data storing unit 29. On the other hand, information used to display the item icons of the content held by the personal computer 60 or the server 70 connected through the network 50 is obtained from the personal computer 60 or the server 70. In this case, the broadcast receiving apparatus 10 may generate information used to display those item icons on the basis of the information obtained from the personal computer 60 or the server 70.

Figure 3:
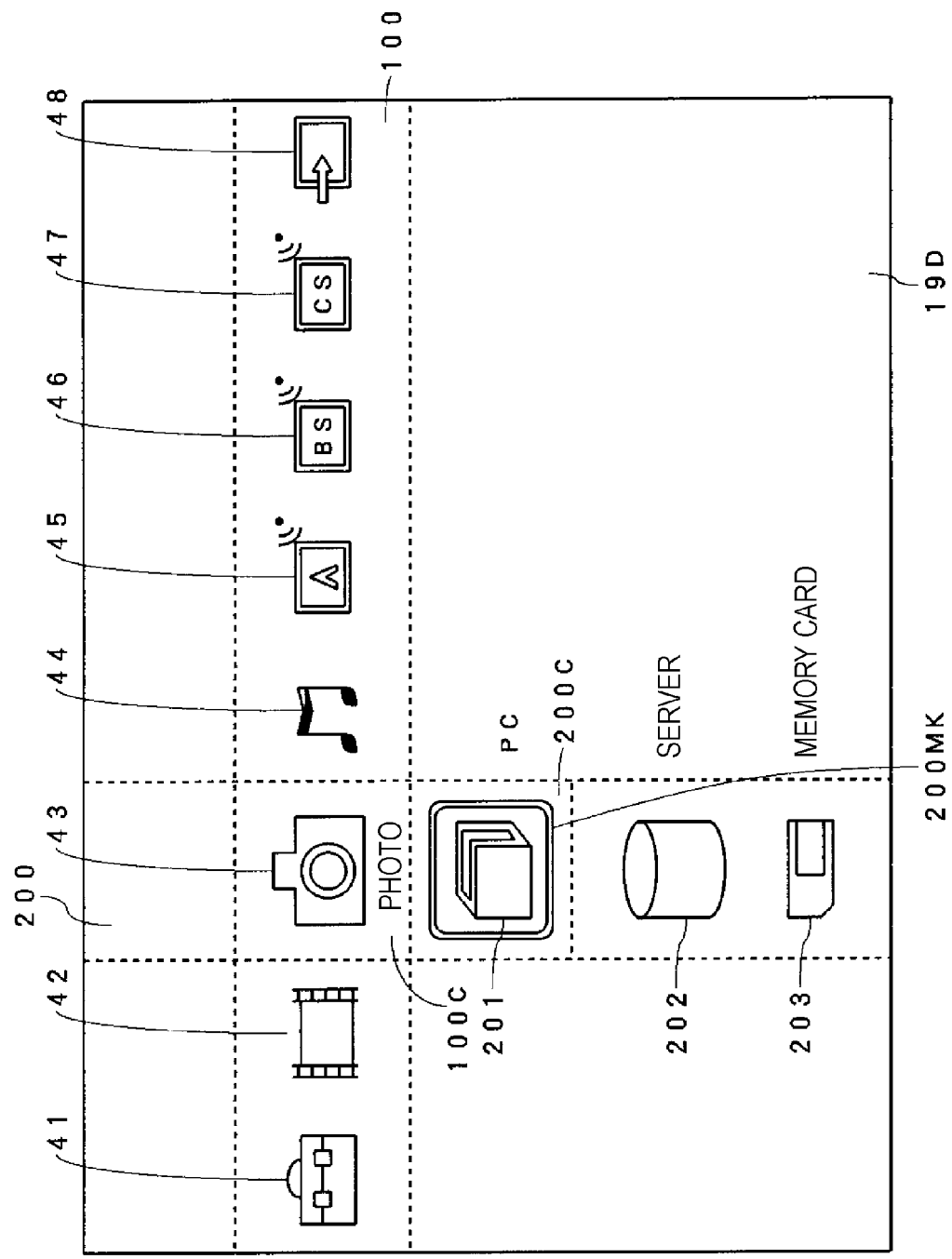
FIG. 3 shows an example of a graphical user interface screen according to an embodiment of the present disclosure.

FIG. 3 shows an example of an initial menu screen of a graphical user interface screen displayed on a screen 19D of the monitor display 19 in this embodiment. In this embodiment, the graphical user interface screen appears on the screen 19D or disappears therefrom upon operation on the home button provided on the remote-control transmitter 23 in the operation input unit.

A two-dimensional array is displayed on this initial menu screen. In the two-dimensional array, a category-icon array 100 where a plurality of category icons are aligned in the horizontal direction and an item-icon array 200 where a plurality of item icons are aligned in the vertical direction cross each other at the vicinity of the center of the screen.

The category-icon array 100 includes the above-described eight types of aligned category icons. More specifically, in FIG. 3, an icon 41 having a figure of a tool box is a category icon of "setting"; an icon 42 having a figure of a film is a category icon of "video"; an icon 43 having a figure of a camera is a category icon of "photo"; an icon 44 having a figure of a musical note is a category icon of "music"; an icon 45 including a figure of a tower is a category icon of "digital terrestrial broadcasting"; an icon 46 including characters "BS" is a category icon of "BS digital broadcasting"; an icon 47 including characters "CS" is a category icon of "CS digital broadcasting"; and an icon 48 including a lateral arrow is a category icon of "external input".

As shown in FIG. 3, in this embodiment, the category-icon array 100 is displayed in the horizontal direction little above the center in the vertical direction of the screen 19D of the monitor display 19. Any one of the eight category icons 41 to 48 is constantly selected and the selected category icon is emphasized, that is, a little larger than the other category icons. Accordingly, the user can recognize the selected icon. In the example shown in FIG. 3, the category icon 43 "photo" is selected. As shown in FIG. 3, the title of the category represented by the category icon is displayed under the selected category icon.

As shown in FIG. 3, in the graphical user interface screen according to this embodiment, all of the eight category icons are constantly displayed, whereas the item-icon array 200 is displayed only for the selected category icon among the eight category icons.

Accordingly, the initial menu of the graphical user interface of this embodiment is constituted by the category-icon array 100 and the item-icon array 200 crossing each other.

In the item-icon array 200, some of item icons representing respective items belonging to the category corresponding to the selected category icon are aligned. In the example shown in FIG. 3, the category icon 43 "photo" is selected, and thus item icons 201, 202, and 203 belonging to the category icon 43 "photo" are aligned in the vertical direction as the item-icon array 200.

In the example shown in FIG. 3, the item icon 201 represents the personal computer 60 serving as a storage unit, the item icon 202 represents the server 70 serving as a storage unit, and the item icon 203 represents the memory card 40 serving as a storage unit.

In the item-icon array 200 shown in FIG. 3, no item icon is displayed above the category-icon array 100. This is because the number of items belonging to the category "photo" is small. If many items belong to the category, item icons are aligned in the vertical direction also above the category-icon array 100. As described below, item icons appear above the category-icon array 100 when the selected item icon changes.

If many lower-layer items belong to a category, as in the category icons 45 to 47 of broadcast media and the category icon 48 of external input, it is difficult to display all of the lower-layer items of the selected category at one time on the screen 19D due to the size of the screen of the monitor display 19. Thus, only part of the item icons belonging to the selected category is displayed as the item-icon array 200 on the screen 19D.

This is the same for the case where many pieces of content are stored in the personal computer 60 or the server 70. That is, it is difficult to display all item icons consisting of representation images representing the respective pieces of content stored in the personal computer 60 or the server 70 at one time on the screen 19D. Thus, only part of the item icons representing the content stored in the selected content storing unit is displayed on the screen 19D.

The graphical user interface screen according to this embodiment is displayed in an on-screen manner. That is, the graphical user interface screen is displayed while being superimposed on an image of video content displayed on the screen 19D such that the video content image can be seen through the screen. In other words, when a broadcast program is being watched in the broadcast receiving apparatus 10 or when images taken by a camera are being played back, the graphical user interface screen is displayed such that the image can be seen through the screen.

Optionally, the entire area of the category-icon array 100 and the item-icon array 200 defined by dotted lines may be colored so that the area can be easily distinguished from a background area of the screen 19D, or the brightness of content images may be adjustable so that the graphical user interface can be clearly seen. Of course, only the category icons and item icons may be displayed without coloring the area or adjusting the brightness.

In the initial menu screen of the graphical user interface screen according to this embodiment, the category-icon array 100 does not move in the vertical direction of the screen 19D, but is fixed at a position little above the center in the vertical direction, as shown in FIG. 3. In this embodiment, a selected category icon is positioned in an intersection area 100C between the category-icon array 100 and the item-icon array 200. The intersection area 100C is also fixed on the screen 19D. As described above, a category title is displayed under the category icon positioned in the intersection area 100C.

When the user performs an operation of selecting another category icon by pressing the right or left button of the remote-control transmitter 23, the entire category-icon array 100 is scrolled to the right or left in accordance with a command from the remote-control transmitter 23, so that another category icon comes to the intersection area 100C as a selected category icon.

The controller 1 recognizes the category icon displayed in the intersection area 100C, that is, the category selected by the user.

Likewise, the item-icon array 200 does not move in the horizontal direction, and is fixed on the left side with respect to the center in the horizontal direction, as shown in FIG. 3. However, a plurality of item icons in the item-icon array 200 can be scrolled in the vertical direction in accordance with a command from the user provided through the up or down button of the remote-control transmitter 23 serving as the operation input unit.

As described above, the position in the vertical direction of the category-icon array 100, in which the category icons 41 to 48 are aligned in the horizontal direction, is fixed. Also, the position in the horizontal direction of the item-icon array 200, in which a plurality of item icons are aligned in the vertical direction, is fixed. Accordingly, the intersection area 100C between the category-icon array 100 and the item-icon array 200 is fixed at a position diagonally upward left with respect to the center of the screen 19D.

In this embodiment, an area 200C immediately under the intersection area 100C is an area for an item icon selected by the user among a plurality of item icons in the item-icon array 200. That is, in this embodiment, the controller 1 regards the item icon displayed in the area 200C (hereinafter referred to as a target area) as a selected item icon (hereinafter, the selected item icon is referred to as a target item icon), and also recognizes the selected item.

According to the above-described layout in the graphical user interface, the target area 200C is positioned at almost the center of the screen 19D. The target item icon displayed in the target area 200C is highlighted so that it can be distinguished from the other item icons. In this example, the target item icon is surrounded by a square frame 200MK colored by a striking color, such as yellow.

The highlighting method used here is not limited to surrounding the target item icon by the square frame 200MK. For example, as the category icons, the target item icon may be colored with a different color from that of the other item icons, or may be enlarged or blinked.

As described above, in this embodiment, the category icon displayed in the fixed intersection area 100C is regarded as a selected icon, and the item icon displayed in the target area 200C immediately under the intersection area 100C is regarded as a target item icon.

With this configuration, when the user wants to select a category, the user scrolls the category-icon array 100 in the horizontal direction so as to place a category icon corresponding to a desired category in the intersection area 100C. Therefore, the user does not need to operate the set button to select the category. This is because, when the selected category icon is positioned in the intersection area 100C, the item-icon array 200 representing a plurality of items belonging to the selected category automatically appears.

Therefore, the user can select a category simply by operating the right or left button, and he/she does not need to perform an operation like that performed in a personal computer, e.g., clicking a fixed icon on a screen with a mouse. In this method, the user can easily make selection even if he/she is not familiar with operating a personal computer.

The respective category icons may be displayed in the same color and same size while they are scrolled in the horizontal direction. Then, after the horizontal scroll has stopped and one of the category icons has been set in the intersection area 100C, the color or size of the selected icon may be changed so as to be highlighted.

The color may be changed by changing an element of the category icon, e.g., brightness, chroma, or hue, or by blinking the icon. In this way, the category icon positioned in the intersection area 100C is displayed in a form different from that of the other category icons, and thus the user can easily select the category.

Alternatively, the following method can be adopted. When any category icon is not positioned in the intersection area 100C during scroll in the horizontal direction of the category icons, the item-icon array 200 is not displayed. In that case, the item-icon array 200 may appear above and below the intersection area 100C after any of the category icons has been set in the intersection area 100C.

The user can recognize items belonging to the category displayed in the intersection area 100C simply by scrolling the category icons in the horizontal direction while regarding the intersection area 100C as a target position. Also, the category can be recognized on the basis of a plurality of items appeared on the screen.

Incidentally, if the right or left button of the remote-control transmitter 23 is pressed under a state where the item-icon array 200 is displayed, the item-icon array 200 can be drawn into the intersection area 100C.

On the other hand, when the user wants to select an item from among lower-layer items of the selected category, he/she scrolls the item-icon array 200 in the vertical direction so as to set an item icon corresponding to a desired item in the target area 200C.

More specifically, the items icons in the item-icon array 200 are scrolled in the vertical direction of the screen 19D in accordance with instructions from the user through the up or down button of the remote-control transmitter 23, and accordingly, the item icon positioned in the target area 200C immediately under the intersection area 100C changes. If the user operates the set button of the remote-control transmitter 23 when the item icon of a desired item is positioned in the target area 200C, the controller 1 of the broadcast receiving apparatus 10 erases the graphical user interface so that a process of the selected item can be executed.

Note that, if further lower-layer items belong to the item icon positioned in the target area 200C, the lower-layer items are displayed on the screen 19D in accordance with an operation of the set button. Examples of such a case include when the above-described personal computer item icon 201 is selected or when the server item icon 202 is selected.

That is, lower-layer items are defined in the item icon 201 "PC" (personal computer) in the example shown in FIG. 3. Thus, if the set button of the remote-control transmitter 23 is operated in the screen shown in FIG. 3, the graphical user interface on the screen 19D displays item icons of a plurality of personal computers (not shown) if the network 50 connects to the plurality of personal computers so that one of the plurality of personal computers can be selected.

At this time, although not shown in the figure, the category-icon array 100 except the selected category icon disappears from the screen 19D, and the item-icon array 200 moves to the left end of the screen 19D so that a space is generated on the right side thereof. Then, the plurality of lower-layer item icons are displayed in this space. More specifically, item icons representing the respective personal computers (see personal computers PC1, PC2, PC3, PC4, and PC5 shown in FIG. 4) are vertically aligned and explanatory information about the items corresponding to the respective item icons is displayed.

Figure 4:
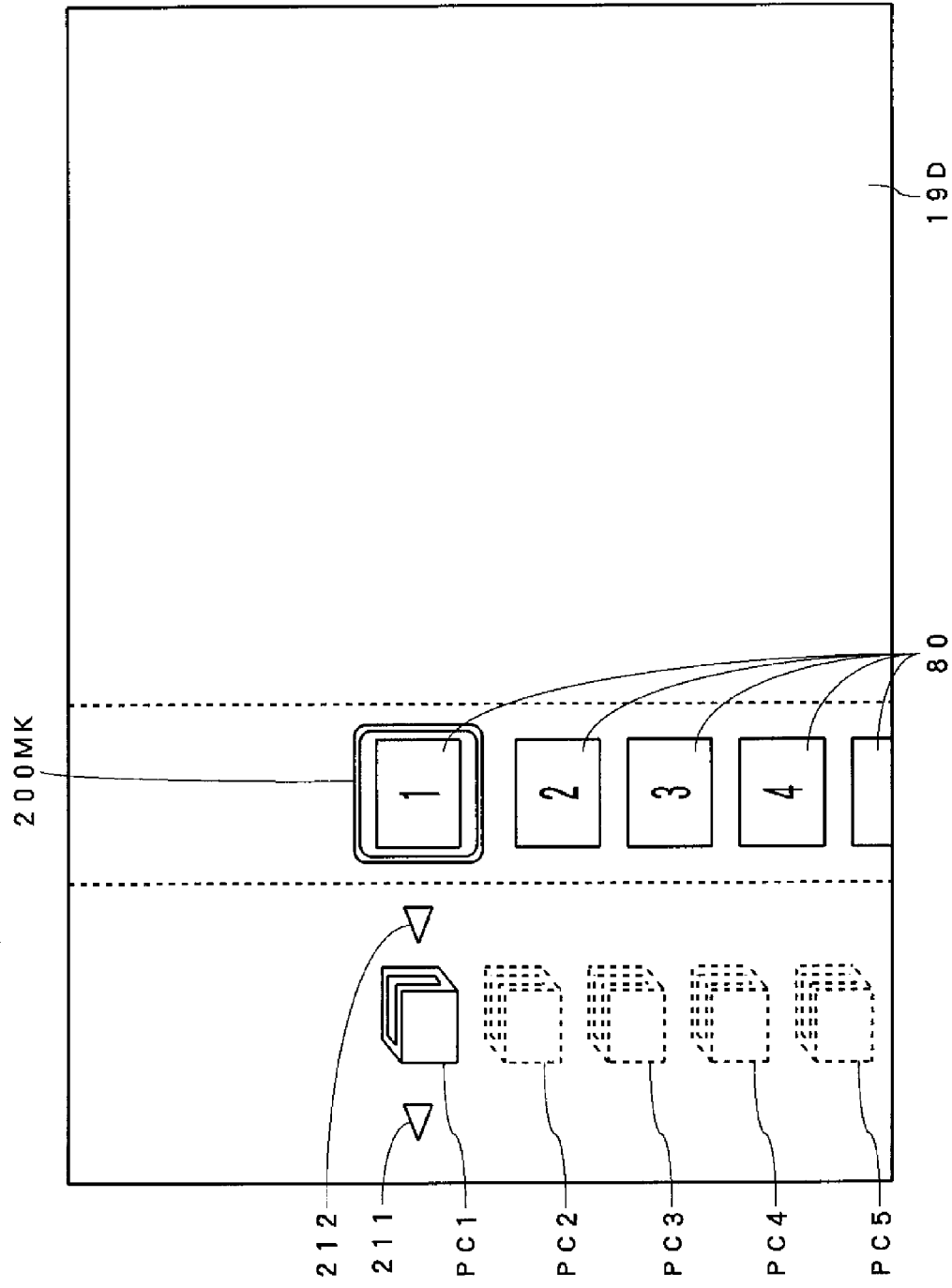
FIG. 4 shows another example of the graphical user interface screen according to an embodiment.

Then, under a state where one of the personal computers has been selected and the corresponding icon is surrounded by the square frame 200MK, if the set button of the remote-control transmitter 23 is operated, the screen shown in FIG. 4 appears on the graphical user interface.

In FIG. 4, an icon drawn with solid lines is an item icon of the selected personal computer PC1. The other icons drawn with dotted lines are item icons of the other personal computers PC2, PC3, PC4, and PC5 that connect to the network 50 but that are not selected. In FIG. 4, triangle marks 211 and 212 represent a hierarchical relationship.

As shown in FIG. 4, after the item icon of the personal computer PC1 has been selected and the set button has been operated, only undetermined icons 80 as undetermined representation images are displayed on the graphical user interface screen.

Before displaying the undetermined icons 80, at the time when the item icon of the personal computer PC1 as a source of content is selected and the set button is operated, the controller 1 asks the personal computer PC1 the total number of pieces of content stored therein and obtains information about the total number transmitted from the personal computer PC1.

Then, the controller 1 recognizes the total number of undetermined icons 80 to be displayed on the graphical user interface screen on the basis of the received information, assigns numbers to the respective undetermined icons 80, and displays the numbers in the icons, as shown in FIG. 4.

The numbers assigned to the undetermined icons 80 correspond to a storing order or a reading order of the content in the content storing unit 60S of the selected personal computer as a source of the content. When information of the numbers assigned to the undetermined icons 80 is transmitted from the broadcast receiving apparatus 10 to the selected personal computer PC1 as a source of the content, the personal computer PC1 recognizes that pieces of content corresponding to the numbers have been specified.

Therefore, the selected personal computer serving as a source of content may deal with each content number transmitted from the broadcast receiving apparatus 10 as a specific number so as to recognize each piece of content. In this case, however, each content number should be constantly recognized as a specific number having the same meaning. This is because the user can recognize which content is transmitted in which order by obtaining content from the same personal computer several times.

If the user selects a desired piece of content on the screen displaying the undetermined icons 80 as shown in FIG. 4, the undetermined icons 80 serving as item icons of pieces of content are scrolled in the vertical direction, so that the target item icon positioned in the square frame 200MK changes.

However, if a state where the user does not select any piece of content and the target item icon surrounded by the square frame 200MK does not change, that is, where the plurality of item icons displayed on the screen 19D are not scrolled, continues for a predetermined time T, the controller 1 transmits a meta-information obtaining request, which includes number information of the undetermined icons displayed on the screen 19D, to the personal computer serving as a source of the content, in order to display item icons including detailed information about content corresponding to the undetermined icons displayed on the screen 19D. In the example shown in FIG. 4, a meta-information obtaining request including number information "1" to "5" is transmitted to the personal computer serving as a source of the content.

The personal computer receives the request and transmits meta-information of the content corresponding to the number information (in this example, thumbnails, compression method, titles, and identification numbers of photo content) to the broadcast receiving apparatus 10.

Figure 5:
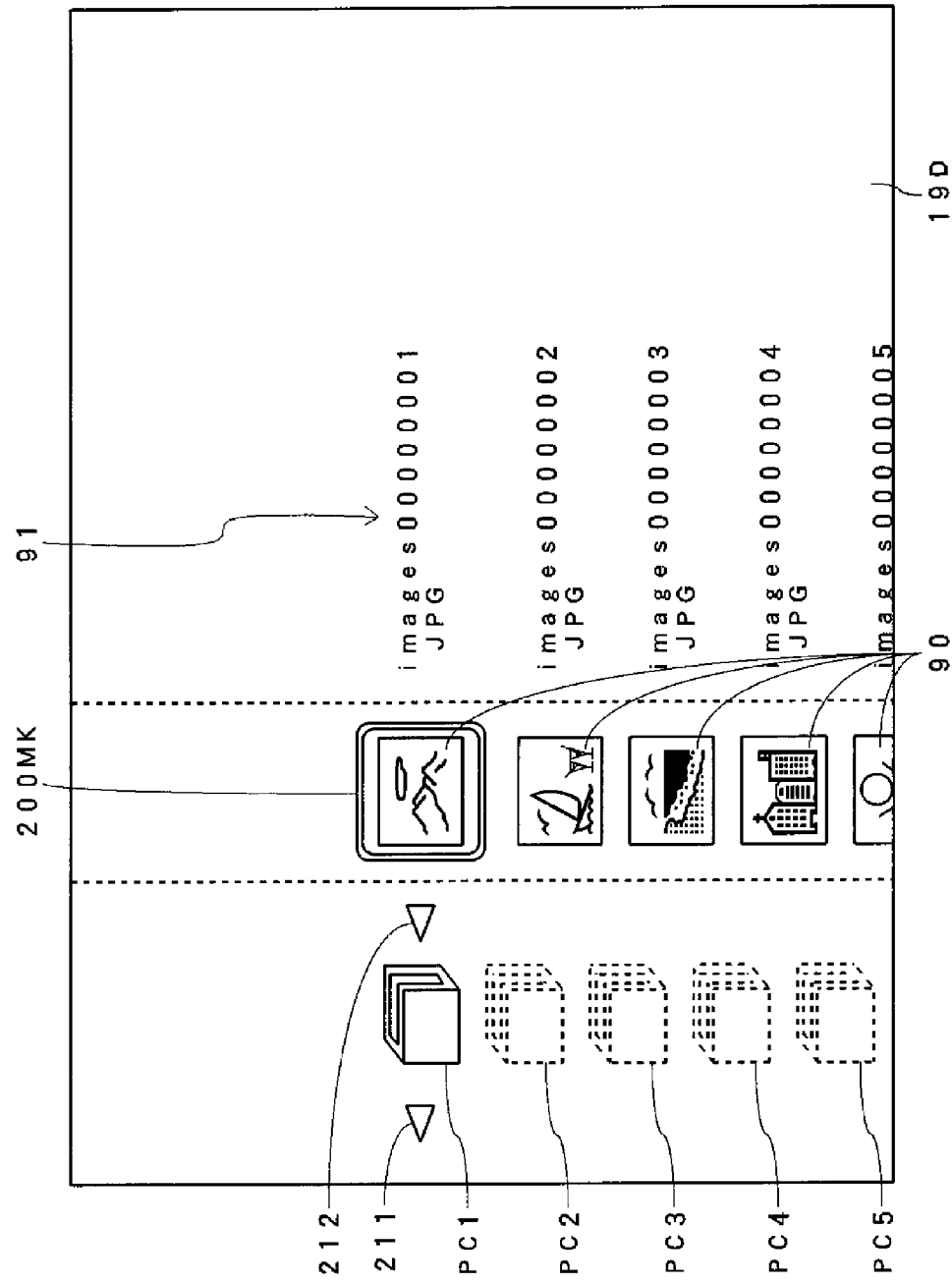
FIG. 5 shows another example of the graphical user interface screen according to an embodiment.

The broadcast receiving apparatus 10 receives the meta-information. Then, as shown in FIG. 5, the apparatus 10 replaces the undetermined icons 80 by item icons 90 and explanations 91 thereof in the graphical user interface on the screen 19D. In the example shown in FIG. 5, the item icons 90 consist of thumbnails of photo content.

Then, the broadcast receiving apparatus 10 stores the meta-information received from the personal computer in the cache buffer of the display data storing unit 29 while checking a free area of the buffer. If there is no free area, the oldest piece of meta-information is deleted to generate a free area so that newly-obtained meta-information can be written therein.

The meta-information stored in the cache buffer is used to replace the undetermined icons 80 by the item icons 90 and the explanations 91. That is, in this embodiment, if the controller 1 of the broadcast receiving apparatus 10 detects that a state where the plurality of item icons displayed on the screen 19D are not scrolled has continued for the predetermined time T, the controller 1 determines whether the cache buffer stores meta-information used to display item icons including detailed information about the content corresponding to the undetermined icons 80 displayed on the screen 19D.

If the controller 1 determines that the meta-information is stored in the cache buffer, the controller 1 obtains the meta-information from the cache buffer, so that replacement of the undetermined icons 80 with the item icons 90 can be performed more quickly.

If meta-information about part of the undetermined icons 80 displayed on the screen 19D is not stored in the cache buffer, a meta-information obtaining request including number information of those undetermined icons is transmitted to the personal computer as a source of the content so as to obtain the meta-information.

Figure 6:
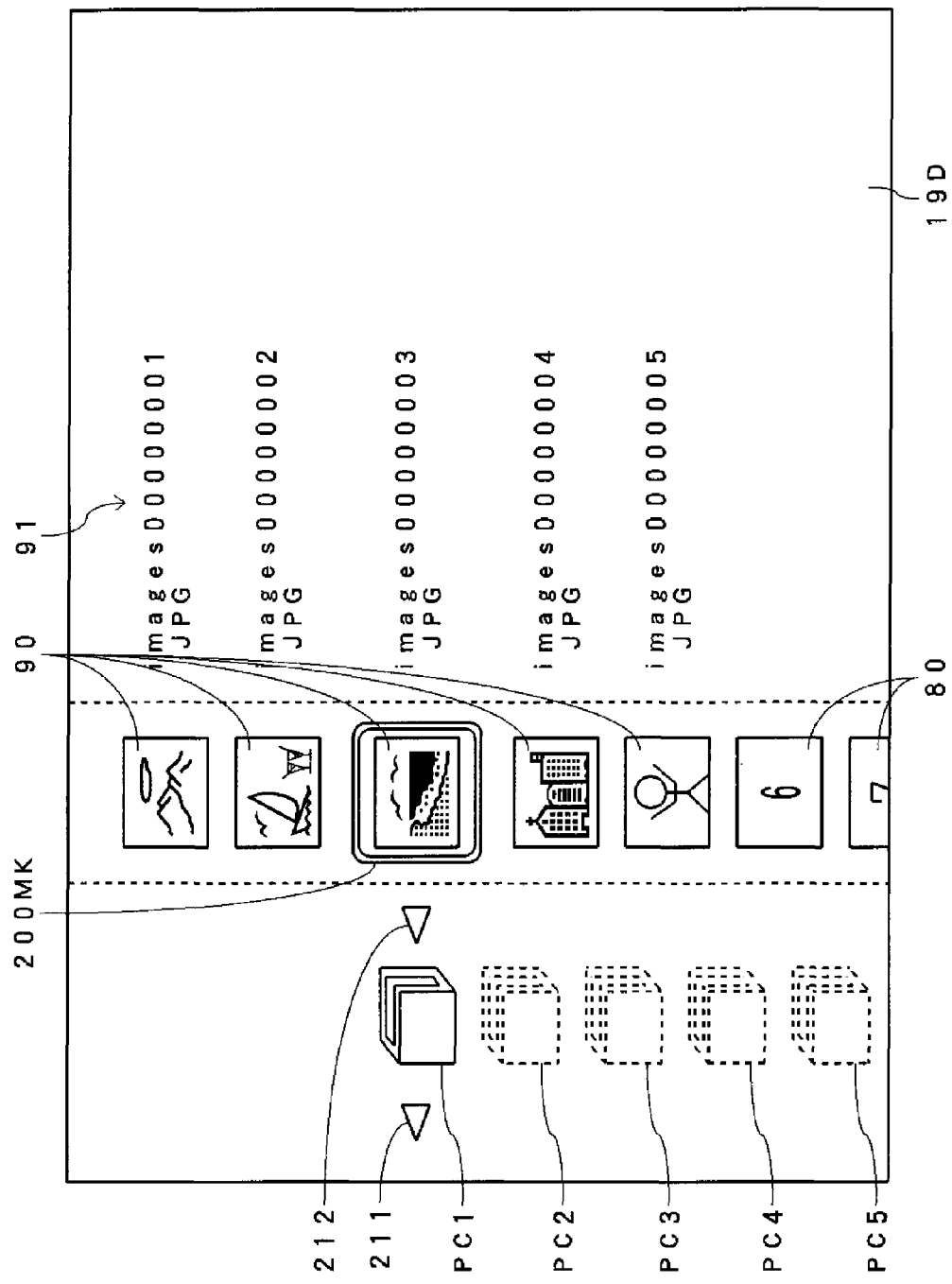
FIG. 6 shows another example of the graphical user interface screen according to an embodiment.

Under a state where the graphical user interface screen shown in FIG. 5 is displayed, if the user operates the down button of the remote-control transmitter 23 so as to change the target item icon, the item icons 90 are scrolled upward on the screen 19D, as shown in FIG. 6. Accordingly, undetermined icons 80 representing other pieces of content are displayed on a lower side of the screen 19D.

If a state where the target item icon surrounded by the square frame 200MK does not change, that is, where the plurality of item icons displayed on the screen 19D are not scrolled, continues for the predetermined time T, and if the controller 1 determines that meta-information used to display the item icons 90 corresponding to the content represented by the newly-displayed undetermined icons 80 is not stored in the cache buffer, the controller 1 transmits a request for obtaining the meta-information together with number information of the displayed undetermined icons 80 to the personal computer serving as a source of the content.

As described above, the personal computer receives the request for obtaining the meta-information and transmits the meta-information about the content corresponding to the number information to the broadcast receiving apparatus 10, so that the broadcast receiving apparatus 10 receives the meta-information. Then, the broadcast receiving apparatus 10 replaces the undetermined icons 80 with item icons 90 consisting of thumbnails and explanations 91 by using the obtained meta-information and stores the meta-information in the cache buffer.

In the example shown in FIG. 6, the user scrolls the item icons only a little, so that only some of the displayed item icons have changed to undetermined icons 80. Thus, the meta-information about the content represented by the newly displayed undetermined icons 80 on the screen 19D is requested to the personal computer serving as a source of the content.

On the other hand, if scroll of the item icons is stopped for the predetermined time T after the item icons have continuously been scrolled for the predetermined time T and all of the icons representing content displayed on the screen 19D have changed to undetermined icons 80, meta-information about the content corresponding to the numbers of all of the undetermined icons 80 displayed on the screen 19D is requested to the personal computer serving as a source of the content.

In this embodiment, the meta-information received from the personal computer is stored in the cache buffer of the display data storing unit 29. Thus, when the user performs an operation of moving the target item icon to the content side where the item icons 90 and the explanations 91 are displayed and when no undetermined icon is displayed on the screen 19D, the item icons 90 and the explanations 91 after the movement are immediately displayed by using the meta-information read from the cache buffer.

In this embodiment, the item icons can be scrolled at high speed so that content can be quickly searched for. For example, if the user keeps the up or down button of the remote-control transmitter 23 pressed for a long time, the item icons are scrolled at high speed in the direction corresponding to the pressed button.

If the target item icon is changed by the high-speed scroll to the content whose meta-information has not been obtained from the personal computer, undetermined icons are displayed on the screen at the high-speed scroll.

Figure 7:
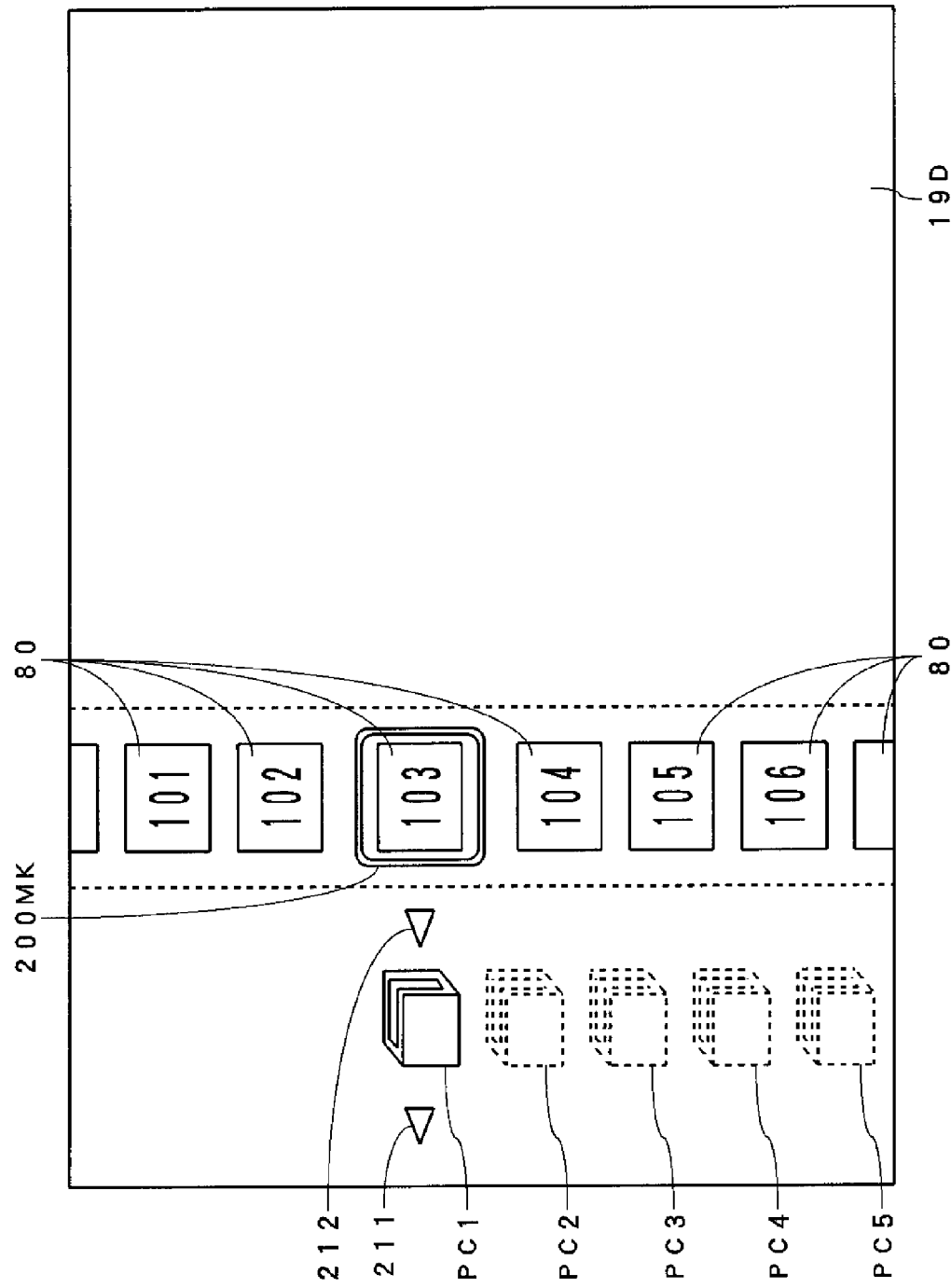
FIG. 7 shows another example of the graphical user interface screen according to an embodiment.

After the high-speed scroll, if the user stops the operation at the icon having a number 103 as shown in FIG. 7 and if a state where the target item icon does not change continues for the predetermined time T or more, a meta-information obtaining request including number information of the undetermined icons 80 displayed in FIG. 7 is transmitted to the personal computer as a source of the content.

Then, the broadcast receiving apparatus 10 receives the meta-information transmitted from the personal computer and replaces the undetermined icons 80 with item icons 90 consisting of thumbnails of content and explanations 91 on the screen 19D.

Figure 8:
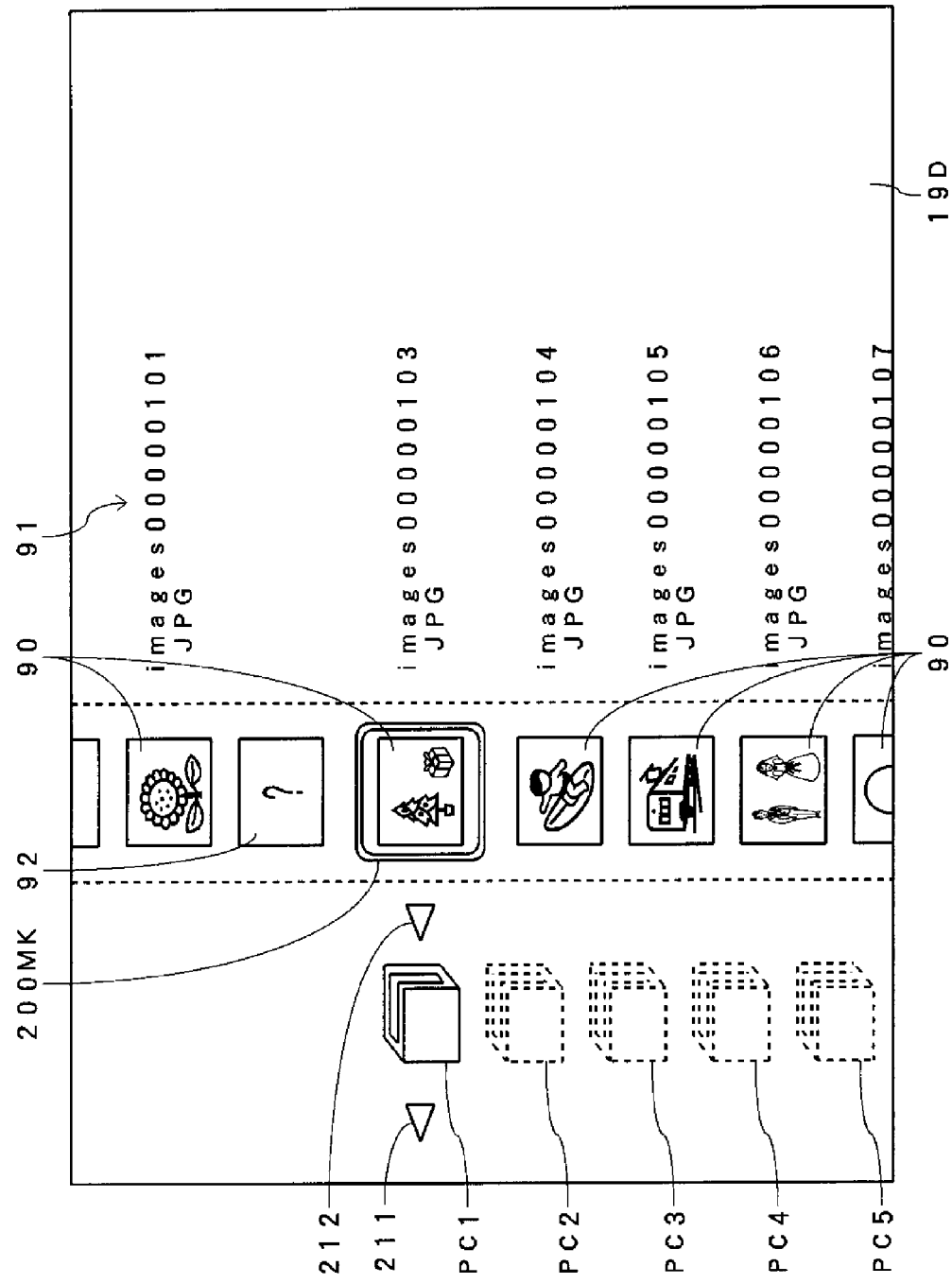
FIG. 8 shows another example of the graphical user interface screen according to an embodiment.

In FIG. 8, an icon 92 with "?" is for notifying the user that the content corresponding to the number 92 has been determined not to be photo content on the basis of the received meta-information.

As described above, the network 50 according to this embodiment is based on DLNA. Thus, when an information file is to be obtained from another apparatus through the network, it may be impossible to obtain only a file of photo content or a file of music content. In such a case, the above-described icon 92 is displayed so as to notify the user that the file does not belong to the category desired by the user.

<Description of the Process Performed in the Graphical User Interface>

Hereinafter, the process performed in the graphical user interface is further described with reference to the flowchart shown in FIGS. 9 to 13, mainly about the process performed by the controller 1, which controls a process in the graphical user interface described above. In the following description, the initial menu screen including the category-icon array 100 and the item-icon array 200 is called a "cross menu".

The broadcast receiving apparatus 10 according to this embodiment is configured so that a power-ON state and a standby state are switched every time a power key of the remote-control transmitter 23 is pressed while a main power switch is turned on. In the standby state, power is supplied to only a part that operates to return to the power-ON state. When the power key is operated and the state changes from the standby state to the power-ON state, the state immediately before the standby state (last state) returns.

In the following description, operation of the power key and other various buttons is performed on the remote-control transmitter 23 by a user. The controller 1 monitors signals transmitted from the remote-control receiver 24 so as to detect a key or a button operated on the remote-control transmitter 23. In the following description, however, an expression "the controller 1 detects an operation on a key or a button" is used for convenience.

Figure 9:
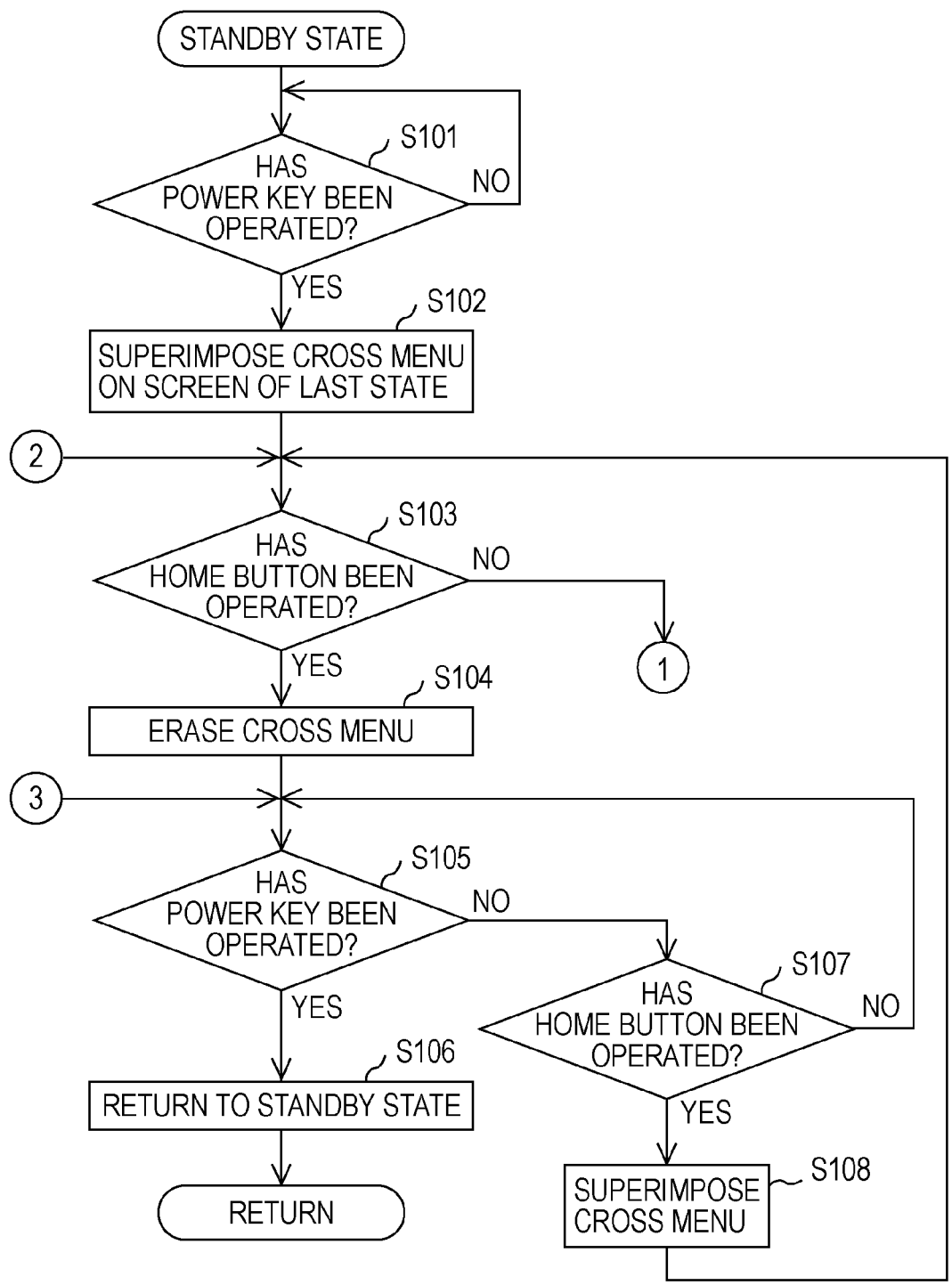
FIG. 9 is a part of a flowchart illustrating a process performed in the graphical user interface screen according to an embodiment.

When the broadcast receiving apparatus 10 according to this embodiment is in the standby state, the controller 1 constantly monitors an operation on the power key, as shown in FIG. 9 (step S101). After detecting in step S101 that the power key has been operated, the controller 1 displays a screen corresponding to the last state on the screen 19D of the monitor display 19 and superimposes the cross menu thereon (step S102).

Then, the controller 1 determines whether the user has operated the home button (step S103). If determining that the home button has been operated, the controller 1 erases the superimposed cross menu from the screen 19D (step S104).

Then, the controller 1 monitors an operation of the power key (step S105). If the controller 1 detects an operation of the power key, the last state is stored and the state returns to the standby state (step S106), and this process routine ends.

If it is determined in step S105 that the power key has not been operated, whether the home button has been operated is determined (step S107). If it is determined that the home button has not been operated, the process returns to step S105. If it is determined in step S107 that the home button has been operated, the controller 1 superimposes the cross menu on the screen 19D of the monitor display 19 (step S108), and then the process returns to step S103.

Figure 10:
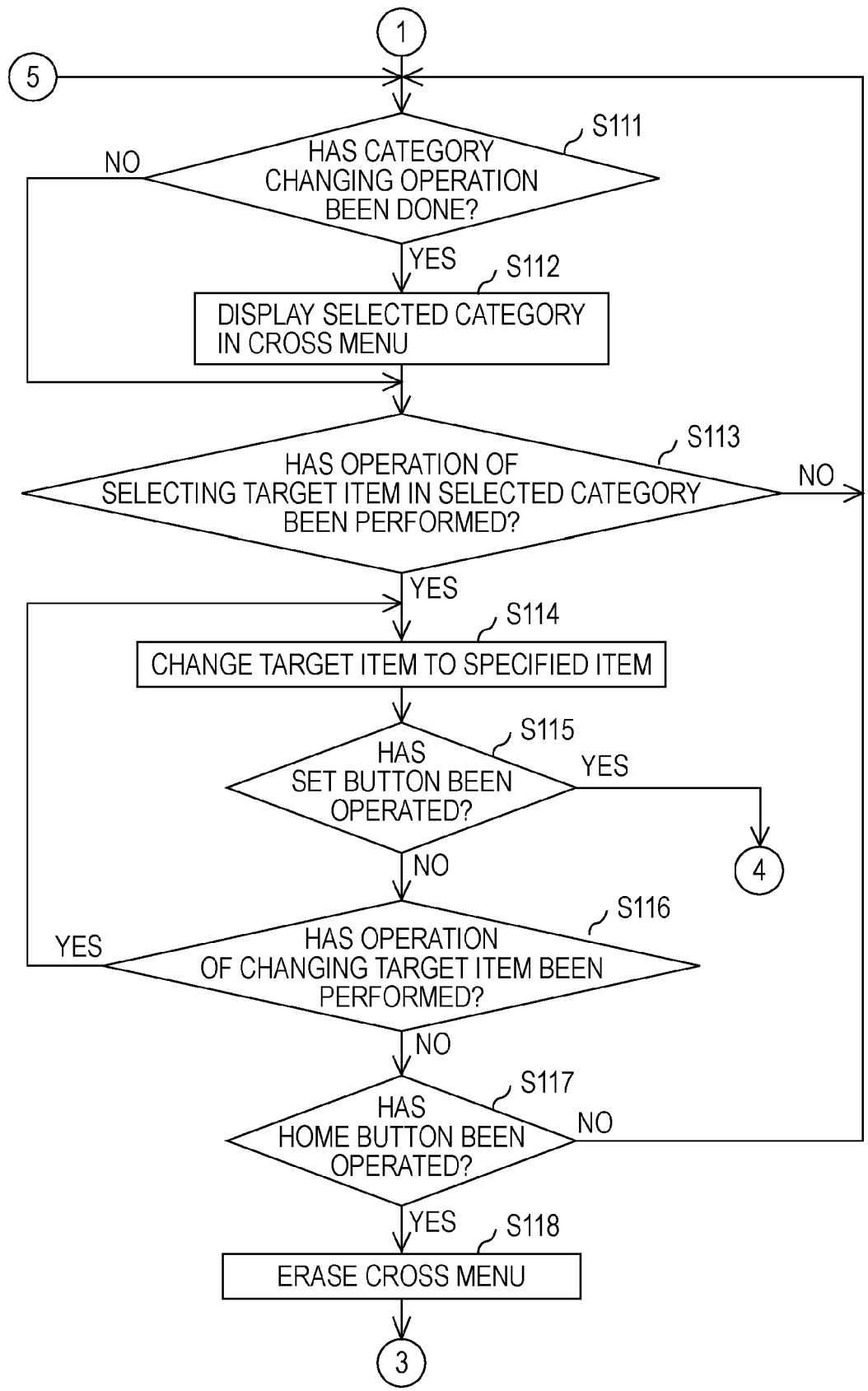
FIG. 10 is a part of the flowchart illustrating the process performed in the graphical user interface screen according to an embodiment.

If determining in step S103 that the home button has not been operated, the controller 1 determines whether a category changing operation has been done with the right or left button of the remote-control transmitter 23 on the graphical user interface including the superimposed cross menu (step S111 in FIG. 10).

If determining in step S111 that the category changing operation has been done on the superimposed cross menu screen, the controller 1 controls the display image generating/outputting unit 30 so as to change the selected category icon on the cross menu screen in accordance with instructions from the user and to change the item-icon array 200 so that the array 200 consists of item icons belonging to the newly-selected category icon. At this time, the controller 1 recognizes the category corresponding to the selected category icon as a selected category (step S112).

If it is determined in step S111 that the category changing operation has not been done or after the selected category has been changed in step S112, the process proceeds to step S113. In step S113, the controller 1 determines whether the up or down button of the remote-control transmitter 23 has been operated so as to determine whether the target item icon in the target area 200C belonging to the selected category has been changed in the item-icon array 200 in the cross menu.

If determining in step S113 that any of the up and down buttons of the remote-control transmitter 23 has been operated, the controller 1 allows the display image generating/outputting unit 30 to change the target item icon displayed in the target area 200C in the cross menu to an icon adjoining the current target item icon in the changed direction, and sets the item corresponding to the item icon that has been newly displayed in the target area 200C as a target item (step S114).

Then, the controller 1 determines whether the set button has been operated on the remote-control transmitter 23 (step 115). If determining that the set button has not been operated, the controller 1 determines whether the up or down button on the remote-control transmitter 23 has been operated so as to determine whether change of the target item icon in the target area 200C has been done in the item-icon array 200 in the cross menu (step S116).

If the controller 1 determines in step S116 that an operation of changing the target item icon in the target area 200C has been performed, the process returns to step S114, and the subsequent steps are repeated.

If determining in step S116 that an operation of changing the target item icon in the target area 200C has not been performed, the controller 1 determines whether the home button has been operated on the remote-control transmitter 23 (step S117). If the determining that the home button has been operated, the controller 1 erases the superimposed cross menu from the screen 19D (step S118). Then, the process proceeds to step S105 in FIG. 9, and the subsequent steps are performed.

If the controller 1 determines in step S117 that the home button has not been operated, the process returns to step S111, and the subsequent steps are repeated.

Figure 11:
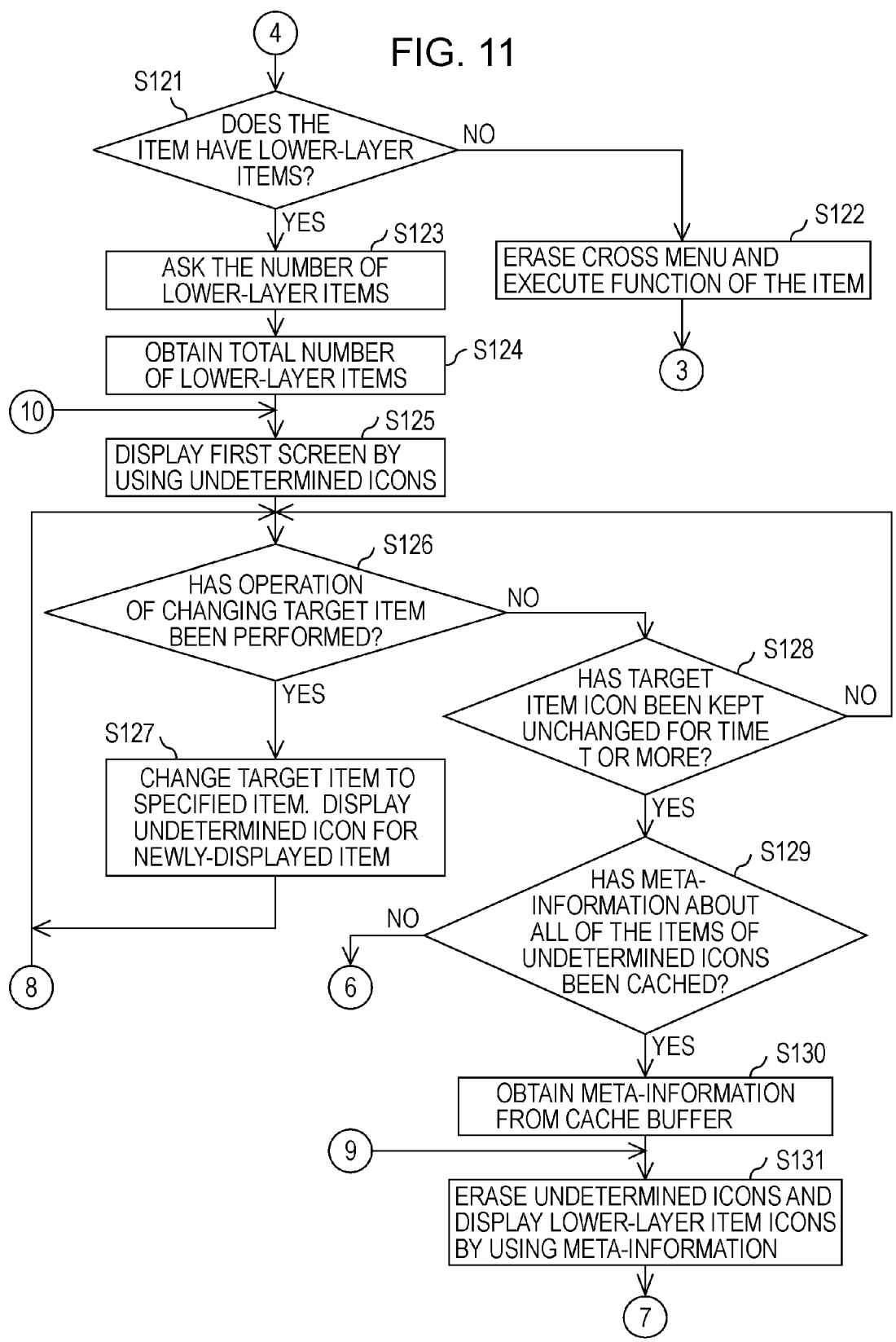
FIG. 11 is a part of the flowchart illustrating the process performed in the graphical user interface screen according to an embodiment.

If determining in step S115 that the set button has been operated, the controller 1 determines whether the set item has lower-layer items (step S121 in FIG. 11). If the item does not have lower-layer items, the controller 1 erases the cross menu from the screen 19D and executes the function or process of the current target item (step S122). Then, the process proceeds to step S105 in FIG. 9, and the subsequent steps are performed.

If determining in step S121 that the item has lower-layer items, the controller 1 asks a source of the lower-layer items the number of the lower-layer items (step S123). Then, the controller 1 obtains information about the total number of the lower-layer items transmitted from the source (step S124).

Then, the controller 1 recognizes the total number of undetermined icons 80 to be displayed on the graphical user interface screen on the basis of the obtained information about the total number of the items, assigns numbers to the respective undetermined icons 80, and displays the first screen shown in FIG. 4 by using the undetermined icons 80 (step S125).

Then, the controller 1 determines whether a target item icon changing operation has been done (step S126). If determining that a target item icon changing operation has been done, the controller 1 changes the target item icon to the specified item. At this time, an undetermined icon 80 is displayed for a newly-displayed item, as shown in FIG. 6 (step S127). Then, the process returns to step S126, and the subsequent steps are repeated. Incidentally, the target item icon changing operation in step S126 includes the above-described high-speed scroll.

If determining in step S126 that the target item icon changing operation has not been performed, the controller 1 determines whether the target item icon has been kept unchanged for a predetermined time T or more (step S128).

If the controller 1 determines in step S128 that the target item icon has been kept unchanged for less than the predetermined time T, the process returns to step S126, and the subsequent steps are repeated.

If determining in step S128 that the target item icon has been kept unchanged for the predetermined time T or more, the controller 1 determines whether meta-information about all of the items displayed as undetermined icons on the screen is stored in the cache buffer (step S129).

If determining in step S129 that meta-information about all of the items displayed as undetermined icons on the screen is stored in the cache buffer, the controller 1 obtains the meta-information about all of the corresponding items from the cache buffer (step S130). Then, the controller 1 erases the undetermined icons 80 and displays item icons 90 showing details by using the obtained meta-information (step S131).

Figure 12:
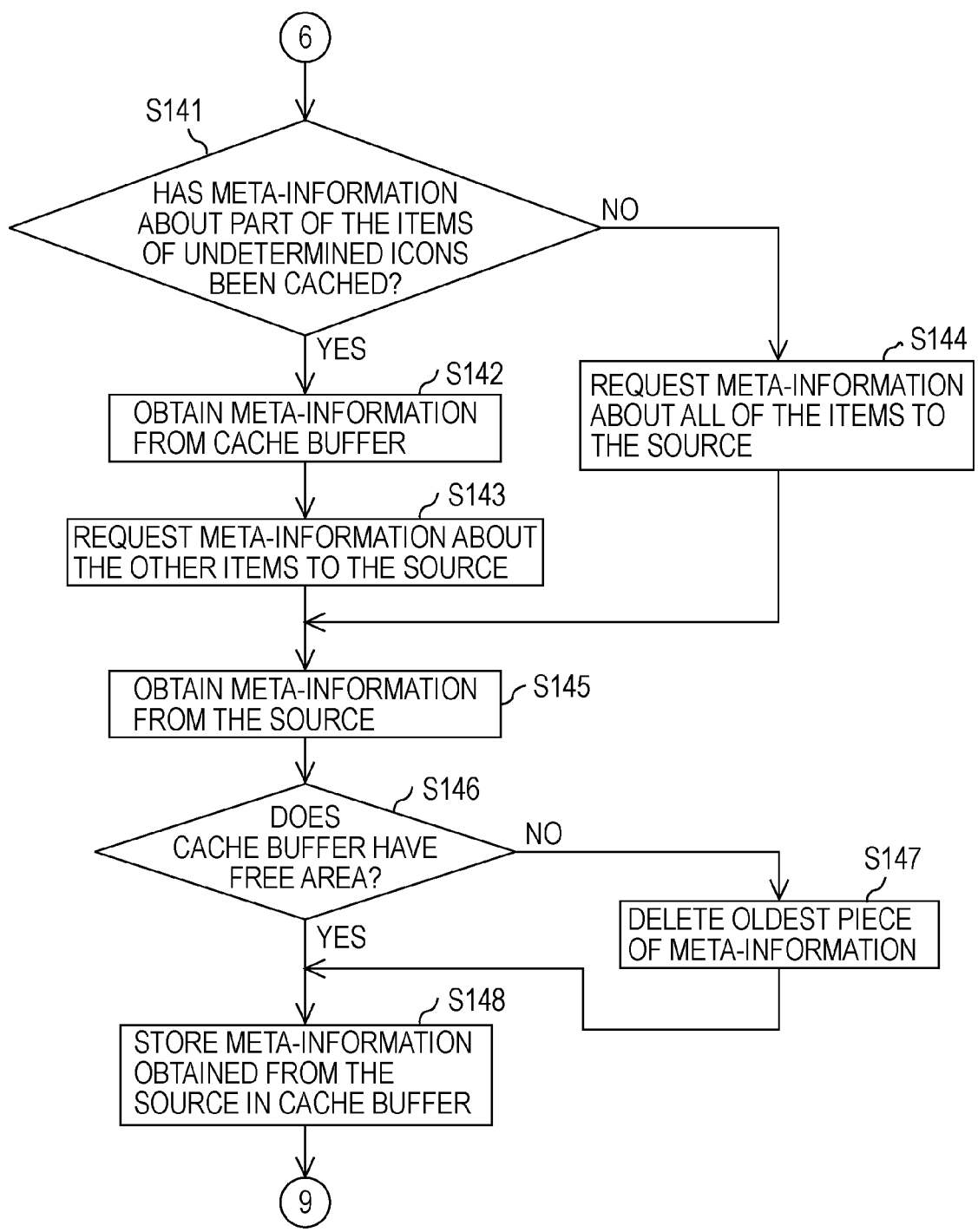
FIG. 12 is a part of the flowchart illustrating the process performed in the graphical user interface screen according to an embodiment.

If determining in step S129 that meta-information about not all of the items displayed as the undetermined icons on the screen is stored in the cache buffer, the controller 1 determines whether meta-information about part of the items of the undetermined icons is stored in the cache buffer (step S141 in FIG. 12).

If determining in step S141 that meta-information about part of the items of the undetermined icons is stored in the cache buffer, the controller 1 reads and obtains the meta-information about part of the items from the cache buffer (step S142). Also, the controller 1 transmits a request for obtaining meta-information about the other items to a source of the lower-layer items (step S143). Then, the controller 1 obtains the meta-information about the other items transmitted from the source of the lower-layer items (step S145).

If determining in step S141 that the cache buffer does not store the meta-information about the items of the displayed undetermined icons, the controller 1 transmits a request for obtaining the meta-information about all of the items displayed as the undetermined icons on the screen to the source of the lower-layer items (step S144). Then, the controller 1 obtains the meta-information transmitted from the source of the lower-layer items (step S145).

After step S145, the controller 1 determines whether the cache buffer has a free area (step S146). If there is no free area, the controller 1 deletes an old piece of the meta-information stored in the cache buffer so as to generate a desired free area (step S147).

If the controller 1 determines in step S146 that the cache buffer has a free area or after a free area has been generated in the cache buffer in step S147, the process proceeds to step S148, where the controller 1 writes and temporarily stores the meta-information obtained from the source of the lower-layer items in the free area of the cache buffer (step S148).

After the meta-information has been temporarily stored in the cache buffer in step S148, the controller 1 erases the undetermined icons 80 and displays item icons 90 showing details corresponding to the items represented by the undetermined icons 80 by using the meta-information obtained in steps S142 and S145 (step S131 in FIG. 11).

Figure 13:
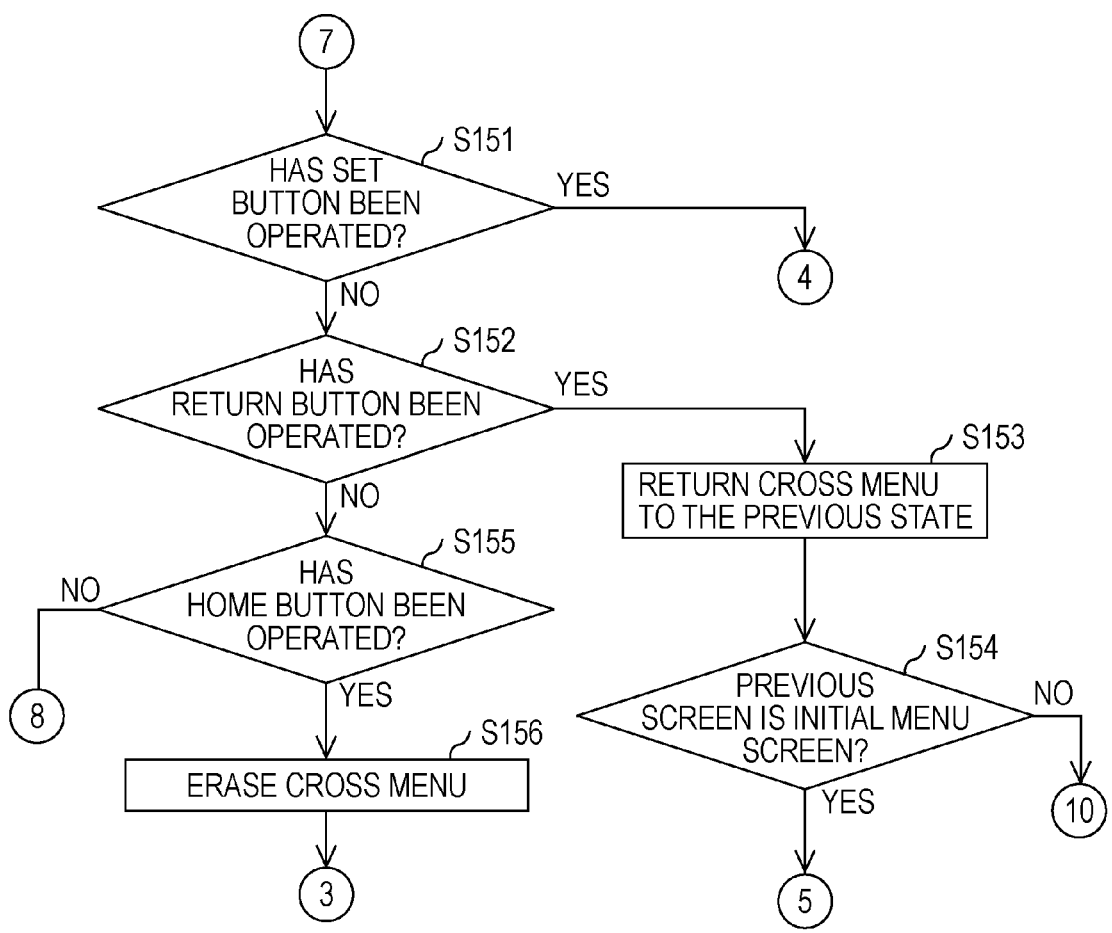
FIG. 13 is a part of the flowchart illustrating the process performed in the graphical user interface screen according to an embodiment.

After step S131, the controller 1 determines whether the set button has been operated on the remote-control transmitter 23 (step S151 in FIG. 13). If the controller 1 determines that the set button has been operated, the process returns to step S121 in FIG. 11, and the subsequent steps are repeated.

If determining in step S151 that the set button has not been operated, the controller 1 determines whether the return button has been operated on the remote-control transmitter 23 (step S152). If determining that the return button has been operated, the controller 1 controls the display image generating/outputting unit 30 so that the cross menu screen is returned to the previous state (step S153).

Then, the controller 1 determines whether the screen displayed before the set button is pressed is the initial menu screen shown in FIG. 3 (step S154). If the previous screen is the initial menu screen, the process returns to step S111 shown in FIG. 10, and the subsequent steps are repeated. If the previous screen is not the initial menu screen but is a menu screen of the immediately upper layer, the process returns to step S125 shown in FIG. 11, and the subsequent steps are repeated.

If determining in step S152 that the return button has not been operated, the controller 1 determines whether the home button has been operated (step S155). If determining that the home button has been operated, the controller 1 erases the superimposed cross menu from the screen 19D (step S156). Then, the process proceeds to step S105 shown in FIG. 9, and the subsequent steps are performed.

If the controller 1 determines in step S155 that the home button has not been operated, the process returns to step S126 and the subsequent steps are repeated.

In the above-described embodiment, the source of content is the personal computer 60. If the source of content is the server 70, the process in the graphical user interface can be performed in the same way as that described above.

In the above-described embodiment, meta-information about only the items corresponding to the undetermined icons displayed on the screen after change of the target item has stopped is obtained from the source through the network. On the other hand, in another embodiment described below, a request for obtaining meta-information about unobtained items is transmitted to the source through the network and the obtained meta-information is written in the cache buffer during an idling time when the user does not perform change of the target item or other operations.

According to this method, when the target item is changed little by little, the possibility that meta-information about items that are newly displayed as undetermined icons is stored in the cache buffer becomes high. Thus, switching from the undetermined icons 80 to the corresponding item icons 90 can be quickly performed.

Hereinafter, a process according to this embodiment is described. This process is basically the same as that of the embodiment described above with reference to the flowchart shown in FIGS. 9 to 13. The difference therebetween is that the flowchart shown in FIG. 11 is replaced by the flowchart shown in FIG. 14, and that the flowchart shown in FIG. 13 is replaced by the flowchart shown in FIG. 15. The others are totally the same as in the above-described embodiment, and thus the corresponding description is omitted.

Figure 14:
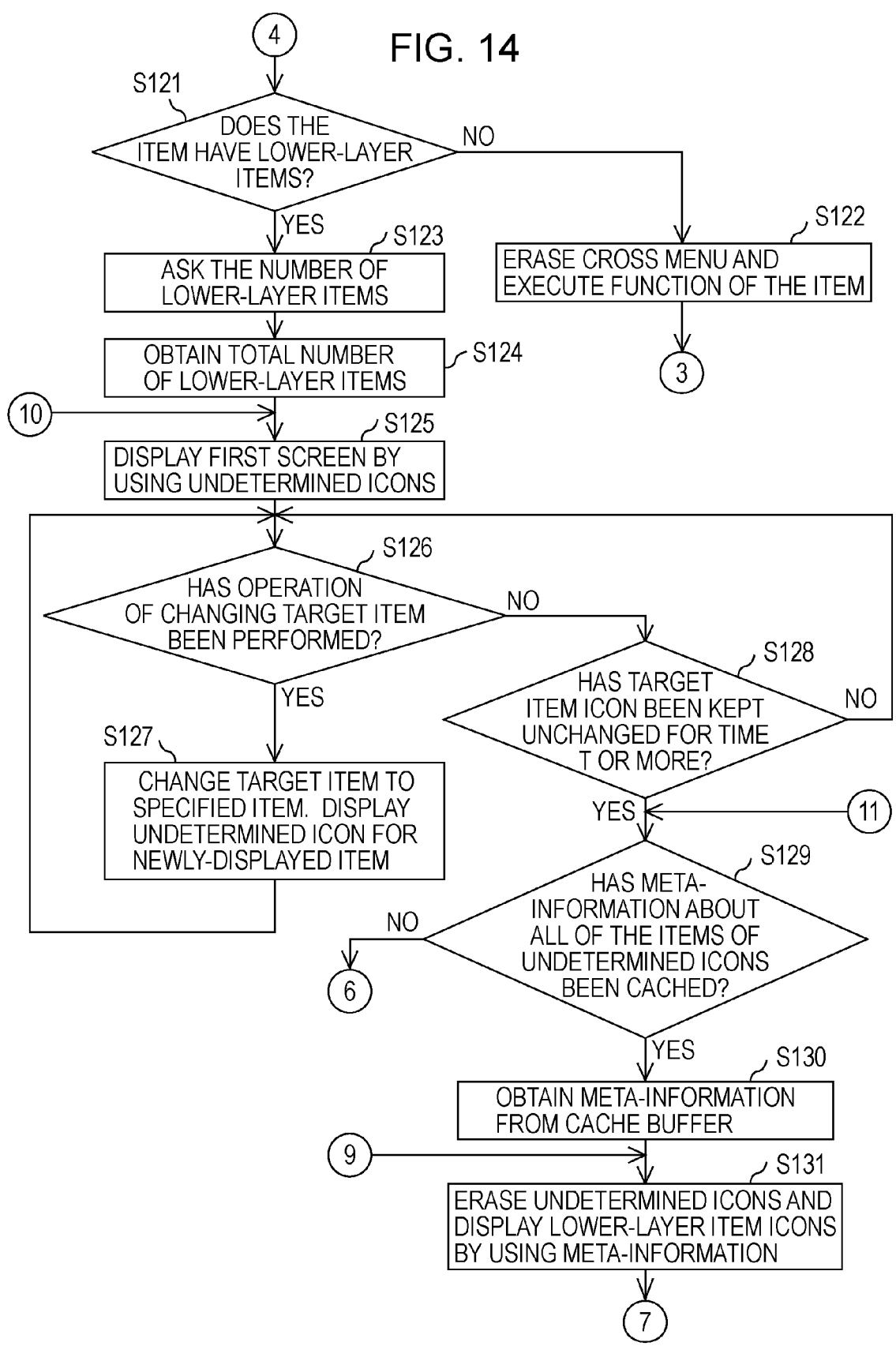
FIG. 14 is a part of a flowchart illustrating a process performed in the graphical user interface screen according to another embodiment.

The respective steps shown in FIG. 14 are the same as those shown in FIG. 11. However, the connection between FIGS. 11 and 13 is different from that between FIGS. 14 and 15. That is, in FIGS. 11 and 13, the process returns from step S155 in FIG. 13 to step S126 in FIG. 11. However, such return to step S126 does not exist in FIG. 14. In FIG. 14, return to step S129, which does not exist in FIG. 11, is provided. Except these points, FIG. 11 is totally the same as FIG. 14.

Figure 15:
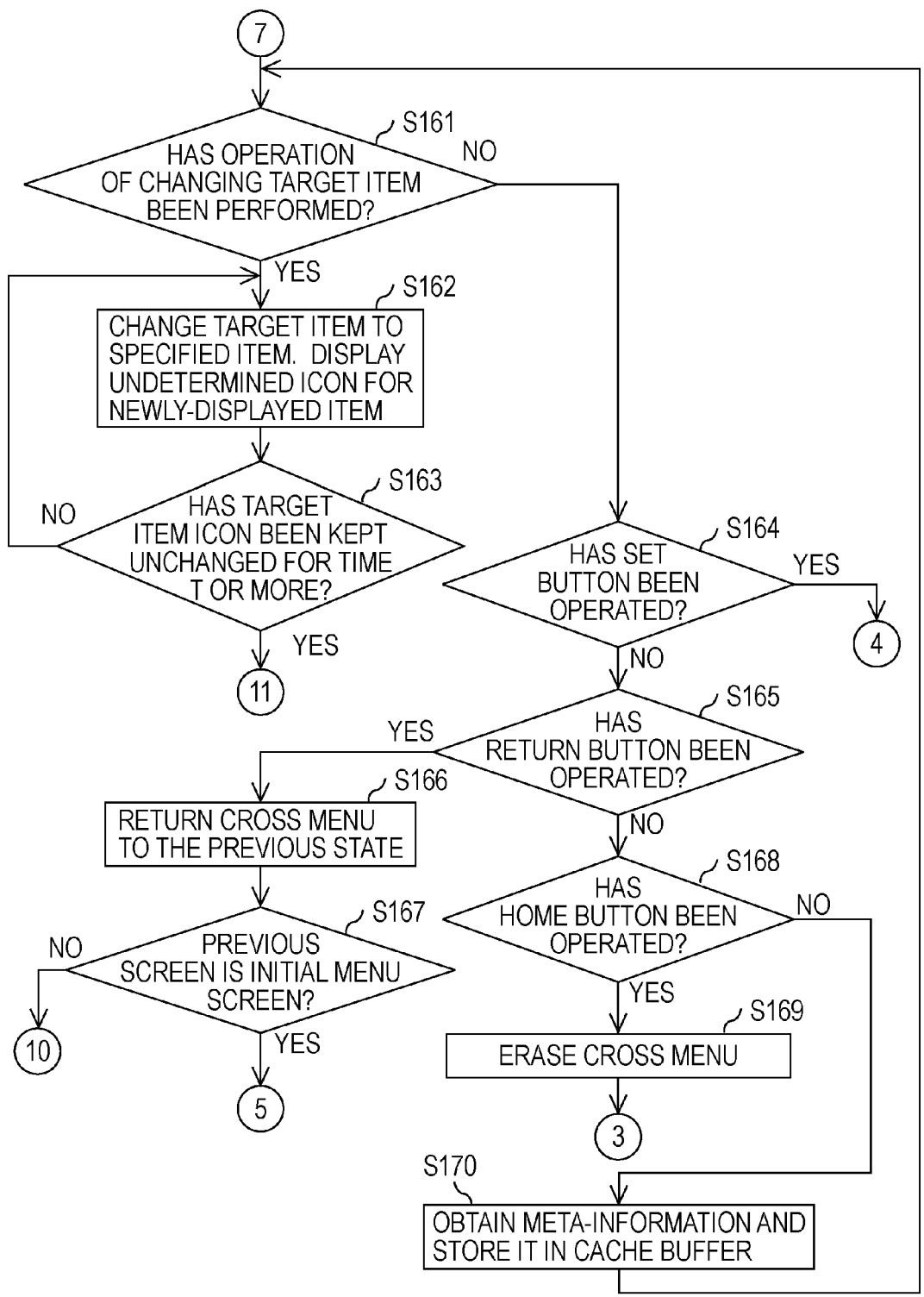
FIG. 15 is a part of the flowchart illustrating the process performed in the graphical user interface screen according to an embodiment.

On the other hand, FIG. 15 is significantly different from FIG. 13. Hereinafter, the flowchart shown in FIG. 15 is described.

After step S131 shown in FIG. 14, where the undetermined icons are erased and item icons showing details are displayed, the controller 1 determines whether a target item icon changing operation has been performed (step S161 in FIG. 15).

If determining in step S161 that the target item icon changing operation has been performed, the controller 1 changes the target item to the specified item. At this time, undetermined icons 80 are displayed for newly-displayed items, as shown in FIG. 6 (step S162). The target item icon changing operation performed in step S161 includes the above-described high-speed scroll.

Then, the controller 1 determines whether the operation of changing the target item icon has stopped and whether the target item icon has been kept unchanged for a predetermined time T or more (step S163). If the controller 1 determines in step S163 that the target item icon has been kept unchanged for less than the predetermined time T, the process returns to step S162, and step S162 is repeated.

If the controller 1 determines in step S163 that the target item icon has been kept unchanged for the predetermined time T or more, the process returns to step S129 shown in FIG. 14, and the subsequent steps are repeated.

If determining in step S161 that the user has not performed an target item icon changing operation, the controller 1 determines whether the set button has been operated on the remote-control transmitter 23 (step S164). If the controller 1 determines that the set button has been operated, the process returns to step S121 shown in FIG. 14 and the subsequent steps are repeated.

If determining in step S164 that the set button has not been operated, the controller 1 determines whether the return button has been operated on the remote-control transmitter 23 (step S165). If determining that the return button has been operated, the controller 1 controls the display image generating/outputting unit 30 so that the superimposed cross menu screen is returned to the previous state (step S166).

Then, the controller 1 determines whether the screen displayed before the set is pressed is the initial menu screen show in FIG. 3 (step S167). If the controller 1 determines that the previous screen is the initial menu screen, the process returns to step S111 shown in FIG. 10 and the subsequent steps are repeated. If the controller 1 determines in step S167 that the previous screen is not the initial menu screen but is a menu screen of the immediately upper layer, the process returns to step S125 shown in FIG. 14 and the subsequent steps are repeated.

If determining in step S165 that the return button has not been operated, the controller 1 determines whether the home button has been operated (step S168). If determining that the home button has been operated, the controller 1 erases the superimposed cross menu from the screen 19D (step S169). Then, the process proceeds to step S105 shown in FIG. 9 and the subsequent steps are performed.

If determining in step S168 that the home button has not been operated, the controller 1 transmits a request for obtaining meta-information about unobtained items of the layer to a source of the items. Then, the controller 1 receives the meta-information from the source and writes it in the cache buffer (step S170). In this case, the meta-information about the subsequent items of the currently displayed item is obtained.

Then, the process returns to step 161 and the subsequent steps are repeated.

In the above-described embodiments, a request for obtaining meta-information is transmitted to the source only if the target item icon has been kept unchanged for the predetermined time T. Alternatively, the request may be transmitted immediately after change of the target item icon has stopped.

In the above-described embodiments, the total number of items is obtained immediately before a list of the items is displayed. Alternatively, information about the total number of items may be obtained at regular intervals or at an appropriate timing through the network. Note that, if there is only one layer, the total number of items of only the layer may be obtained, but if there are a plurality of layers, the total number of items of each layer is obtained.

In the above-described embodiments, representation images of content transmitted from an apparatus through a network are displayed. Alternatively, representation images may be displayed by obtaining meta-information for displaying the representation images from a media storage included in the electronic apparatus. This method is particularly effective when much time takes to obtain meta-information from the media storage included in the electronic apparatus and when it is difficult to quickly display the representation images.

In the above-described embodiments, an item icon belonging to a category icon has lower-layer items, and representation images representing the lower-layer items are displayed. Also, an embodiment of the present disclosure can be applied to a case where item icons belonging to a category icon are displayed after the selected category icon has been changed.

That is, an embodiment can be applied to a case where categories are media connected to a network and functions such as applications provided by a plurality of electronic apparatuses connected to the network are displayed as a category menu on the screen.

Items to be selected represented by item icons or thumbnails may include other types of content, e.g. an electronic book and a game program. In the example shown in the figures, the representation images consist of icons including a figure or a character, icons including a channel number, or thumbnails of part of a broadcast program or the like. Other symbols can also be used as the representation images.

The cache buffer is provided in the display data storing unit 29. However, the present disclosure is not limited to this manner, but the cache buffer may be provided in the controller 1.

In the above-described embodiments, a broadcast receiving apparatus is used as the electronic apparatus. However, the electronic apparatus is not limited to the broadcast receiving apparatus, but any other type of electronic apparatus may be applied as long as the electronic apparatus has a plurality of categories each of which has a plurality of processing functions in a lower layer, e.g., a recording/playback apparatus for image data and audio data.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic apparatus to display a portion of representation images representing a plurality of items to be provided from a source on a screen in a line as items to be selected and to change some of the representation images displayed on the screen in accordance with a user's operation input through a user operation accepting unit, the electronic apparatus comprising:
   total-number obtaining means for obtaining information about a total number of the items to be provided from the source;
   first display means for displaying undetermined representation images on the screen if it is determined that some of the representation images displayed on the screen have been changed, the undetermined representation images being generated on the basis of the total number obtained by the total-number obtaining means so that the respective undetermined representation images correspond to the total number of the items to be provided, wherein one or more numbers that correspond to at least one of a storing order and a reading order are assigned to each undetermined representation image, and wherein the one or more numbers are displayed in conjunction with the undetermined representation images;
   determining means for determining whether change of the representation images displayed on the screen performed by the user's operation has stopped; and
   second display means for displaying the respective representation images in place of the undetermined representation images by obtaining, from the source, information to display the representation images to be newly displayed on the screen if the determining means determines that change of the representation images displayed on the screen performed by the user's operation has stopped,
   wherein the representation images comprise meta-information that represents the plurality of items.

2. The electronic apparatus according to claim 1, wherein the total-number obtaining means asks the source the total number of the items to be provided and obtains information about the total number from the source before the representation images representing the respective items to be provided from the source are displayed on the screen in accordance with the user's operation.

3. The electronic apparatus according to claim 1, wherein the source connects to the electronic apparatus through a network.

4. The electronic apparatus according to claim 1, wherein numbers corresponding to the order of the items to be provided from the source are assigned to the undetermined representation images.

5. An electronic apparatus to display some of representation images representing a plurality of items to be provided from a source on a screen in a line as items to be selected and to change some of the representation images displayed on the screen in accordance with a user's operation input through a user operation accepting unit, the electronic apparatus comprising:

- total-number obtaining means for obtaining information about a total number of the items to be provided from the source;
- first display means for displaying undetermined representation images on the screen if it is determined that some of the representation images displayed on the screen have been changed, the undetermined representation images being generated on the basis of the total number obtained by the total-number obtaining means so that the respective undetermined representation images correspond to the total number of the items to be provided, wherein one or more numbers that correspond to at least one of a storing order and a reading order are assigned to each undetermined representation image, and wherein the one or more numbers are displayed in conjunction with the undetermined representation images;
- first determining means for determining whether change of the representation images displayed on the screen performed by the user's operation has stopped;
- second determining means for determining whether information to display some of the representation images to be newly displayed on the screen has already been stored in a buffer memory if the first determining means determines that change of the representation images displayed on the screen performed by the user's operation has stopped;
- second display means for displaying the respective representation images in place of the undetermined representation images by obtaining the information stored in the buffer memory on the basis of a determination result generated by the second determining means and by obtaining information that has not been stored in the buffer memory from the source; and
- writing means for writing the information to display the representation images obtained from the source in the buffer memory,
- wherein the representation images comprise meta-information that represents the plurality of items.

6. The electronic apparatus according to claim 5,
wherein, if the buffer memory does not have any free area, the oldest piece of the information to display the representation images is deleted and a newly-obtained piece of the information to display the representation images is written.

7. The electronic apparatus according to claim 5,
wherein, even when the user's operation is not input through the user operation accepting unit, information to display the representation images is obtained from the source and is written in the buffer memory.

8. A display control method for an electronic apparatus to display a portion of representation images representing a plurality of items to be provided from a source on a screen in a line as items to be selected and to change some of the representation images displayed on the screen in accordance with a user's operation input through a user operation accepting unit, the display control method comprising the steps of:

- obtaining information about a total number of the items to be provided from the source;
- displaying undetermined representation images on the screen if it is determined that some of the representation images displayed on the screen have been changed, the undetermined representation images being generated on the basis of the total number obtained in the obtaining step so that the respective undetermined representation images correspond to the total number of the items to be provided, wherein one or more numbers that correspond to at least one of a storing order and a reading order are assigned to each undetermined representation image, and wherein the one or more numbers are displayed in conjunction with the undetermined representation images;
- determining whether change of the representation images displayed on the screen performed by the user's operation has stopped; and
- displaying the respective representation images in place of the undetermined representation images by obtaining, from the source, information to display the representation images to be newly displayed on the screen if the determining step determines that change of the representation images displayed on the screen performed by the user's operation has stopped,
- wherein the representation images comprise meta-information that represents the plurality of items.

9. A display control method for an electronic apparatus to display a portion of representation images representing a plurality of items to be provided from a source on a screen in a line as items to be selected and to change some of the representation images displayed on the screen in accordance with a user's operation input through a user operation accepting unit, the display control method comprising the steps of:

- obtaining information about a total number of the items to be provided from the source;
- displaying undetermined representation images on the screen if it is determined that some of the representation images displayed on the screen have been changed, the undetermined representation images being generated on the basis of the total number obtained in the obtaining step so that the respective undetermined representation images correspond to the total number of the items to be provided, wherein one or more numbers that correspond to at least one of a storing order and a reading order are assigned to each undetermined representation image, and wherein the one or more numbers are displayed in conjunction with the undetermined representation images;
- determining whether change of the representation images displayed on the screen performed by the user's operation has stopped;
- determining whether information to display some of the representation images to be newly displayed on the screen has already been stored in a buffer memory if the previous determining step determines that change of the representation images displayed on the screen performed by the user's operation has stopped;
- displaying the respective representation images in place of the undetermined representation images by obtaining the information stored in the buffer memory on the basis of a determination result generated in the latter determining step and by obtaining information that has not been stored in the buffer memory from the source; and
- writing the information to display the representation images obtained from the source in the buffer memory,
- wherein the representation images comprise meta-information that represents the plurality of items.

10. A graphical user interface in which some of representation images representing a plurality of items to be provided from a source are displayed on a screen in a line as items to be selected and some of the representation images displayed on the screen are changed in accordance with a user's operation, comprising:

information about a total number of the items to be provided is obtained from the source;

undetermined representation images are displayed on the screen if it is determined that some of the representation images displayed on the screen have been changed in accordance with the user's operation, the undetermined representation images being generated on the basis of the obtained total number so that the respective undetermined representation images correspond to the total number of the items to be provided, wherein one or more numbers that correspond to at least one of a storing order and a reading order are assigned to each undetermined representation image, and wherein the one or more numbers are displayed in conjunction with the undetermined representation images; and if it is determined that change of the representation images displayed on the screen performed by the user's operation has stopped, information to display the representation images to be newly displayed on the screen is obtained from the source and the respective representation images are displayed in place of the undetermined representation images, wherein the representation images comprise meta-information that represents the plurality of items.

11. A graphical user interface in which some of representation images representing a plurality of items to be provided from a source are displayed on a screen in a line as items to be selected and some of the representation images displayed on the screen are changed in accordance with a user's operation, comprising:

information about a total number of the items to be provided is obtained from the source;

undetermined representation images are displayed on the screen if it is determined that some of the representation images displayed on the screen have been changed in accordance with the user's operation, the undetermined representation images being generated on the basis of the obtained total number so that the respective undetermined representation images correspond to the total number of the items to be provided, wherein one or more numbers that correspond to at least one of a storing order and a reading order are assigned to each undetermined representation image, and wherein the one or more numbers are displayed in conjunction with the undetermined representation images; and if it is determined that change of the representation images displayed on the screen performed by the user's operation has stopped, information that has already been stored in a buffer memory among information to display the representation images to be newly displayed on the screen is obtained from the buffer memory and information that has not been stored in the buffer memory is obtained from the source, so that the respective representation images are displayed in place of the undetermined representation images, wherein the representation images comprise meta-information that represents the plurality of items.

12. A display control program allowing a computer to function, the display control program comprising:

total-number obtaining means for obtaining information about a total number of items to be provided from a source;

first display means for displaying undetermined representation images on a screen if it is determined that some of the representation images displayed on the screen have been changed, the undetermined representation images being generated on the basis of the total number obtained by the total-number obtaining means so that the respective undetermined representation images correspond to the total number of the items to be provided, wherein one or more numbers that correspond to at least one of a storing order and a reading order are assigned to each undetermined representation image, and wherein the one or more numbers are displayed in conjunction with the undetermined representation images;

determining means for determining whether change of the representation images displayed on the screen performed by a user's operation has stopped; and second display means for displaying the respective representation images in place of the undetermined representation images by obtaining, from the source, information to display the representation images to be newly displayed on the screen if the determining means determines that change of the representation images displayed on the screen performed by the user's operation has stopped, wherein the display control program allows the computer to display some of the representation images representing a plurality of items to be provided from the source on the screen in a line as items to be selected and to change some of the representation images displayed on the screen in accordance with a user's operation input through a user operation accepting unit, wherein the representation images comprise meta-information that represents the plurality of items.

13. A display control program allowing a computer to function, the display control program comprising:

total-number obtaining means for obtaining information about a total number of items to be provided from a source;

first display means for displaying undetermined representation images on a screen if it is determined that some of the representation images displayed on the screen have been changed, the undetermined representation images being generated on the basis of the total number obtained by the total-number obtaining means so that the respective undetermined representation images correspond to the total number of the items to be provided, wherein one or more numbers that correspond to at least one of a storing order and a reading order are assigned to each undetermined representation image, and wherein the one or more numbers are displayed in conjunction with the undetermined representation images;

first determining means for determining whether change of the representation images displayed on the screen performed by a user's operation has stopped;

second determining means for determining whether information to display some of the representation images to be newly displayed on the screen has already been stored in a buffer memory if the first determining means determines that change of the representation images displayed on the screen performed by the user's operation has stopped;

second display means for displaying the respective representation images in place of the undetermined representation images by obtaining the information stored in the buffer memory on the basis of a determination result generated by the second determining means and by obtaining information that has not been stored in the buffer memory from the source; and writing means for writing the information to display the representation images obtained from the source in the buffer memory, wherein the display control program allows the computer to display some of the representation images representing a plurality of items to be provided from the source on the screen in a line as items to be selected and to change some of the representation images displayed on the screen in accordance with a user's operation input through a user operation accepting unit, wherein the representation images comprise meta-information that represents the plurality of items.

14. An electronic apparatus to display some of representation images representing a plurality of items to be provided from a source on a screen in a line as items to be selected and to change some of the representation images displayed on the screen in accordance with a user's operation input through a user operation accepting unit, the electronic apparatus comprising:

a total-number obtaining unit configured to obtain information about a total number of the items to be provided from the source;

a first display unit configured to display undetermined representation images on the screen if it is determined that some of the representation images displayed on the screen have been changed, the undetermined representation images being generated on the basis of the total number obtained by the total-number obtaining unit so that the respective undetermined representation images correspond to the total number of the items to be provided, wherein one or more numbers that correspond to at least one of a storing order and a reading order are assigned to each undetermined representation image, and wherein the one or more numbers are displayed in conjunction with the undetermined representation images;

a determining unit configured to determine whether change of the representation images displayed on the screen performed by the user's operation has stopped; and a second display unit configured to display the respective representation images in place of the undetermined representation images by obtaining, from the source, information to display the representation images to be newly displayed on the screen if the determining unit determines that change of the representation images displayed on the screen performed by the user's operation has stopped, wherein the representation images comprise meta-information that represents the plurality of items.

15. An electronic apparatus to display some of representation images representing a plurality of items to be provided from a source on a screen in a line as items to be selected and to change some of the representation images displayed on the screen in accordance with a user's operation input through a user operation accepting unit, the electronic apparatus comprising:

a total-number obtaining unit configured to obtain information about a total number of the items to be provided from the source;

a first display unit configured to display undetermined representation images on the screen if it is determined that some of the representation images displayed on the screen have been changed, the undetermined representation images being generated on the basis of the total number obtained by the total-number obtaining unit so that the respective undetermined representation images correspond to the total number of the items to be provided, wherein one or more numbers that correspond to at least one of a storing order and a reading order are assigned to each undetermined representation image, and wherein the one or more numbers are displayed in conjunction with the undetermined representation images;

a first determining unit configured to determine whether change of the representation images displayed on the screen performed by the user's operation has stopped;

a second determining unit configured to determine whether information to display some of the representation images to be newly displayed on the screen has already been stored in a buffer memory if the first determining unit determines that change of the representation images displayed on the screen performed by the user's operation has stopped;

a second display unit configured to display the respective representation images in place of the undetermined representation images by obtaining the information stored in the buffer memory on the basis of a determination result generated by the second determining unit and by obtaining information that has not been stored in the buffer memory from the source; and a writing unit configured to write the information to display the representation images obtained from the source in the buffer memory, wherein the representation images comprise meta-information that represents the plurality of items.

* * * * *